Jan. 13, 1948.  A. H. DICKINSON  2,434,487
RECORD CONTROLLED ADDING AND COMPARING MACHINE
Filed Sept. 13, 1941  11 Sheets-Sheet 1
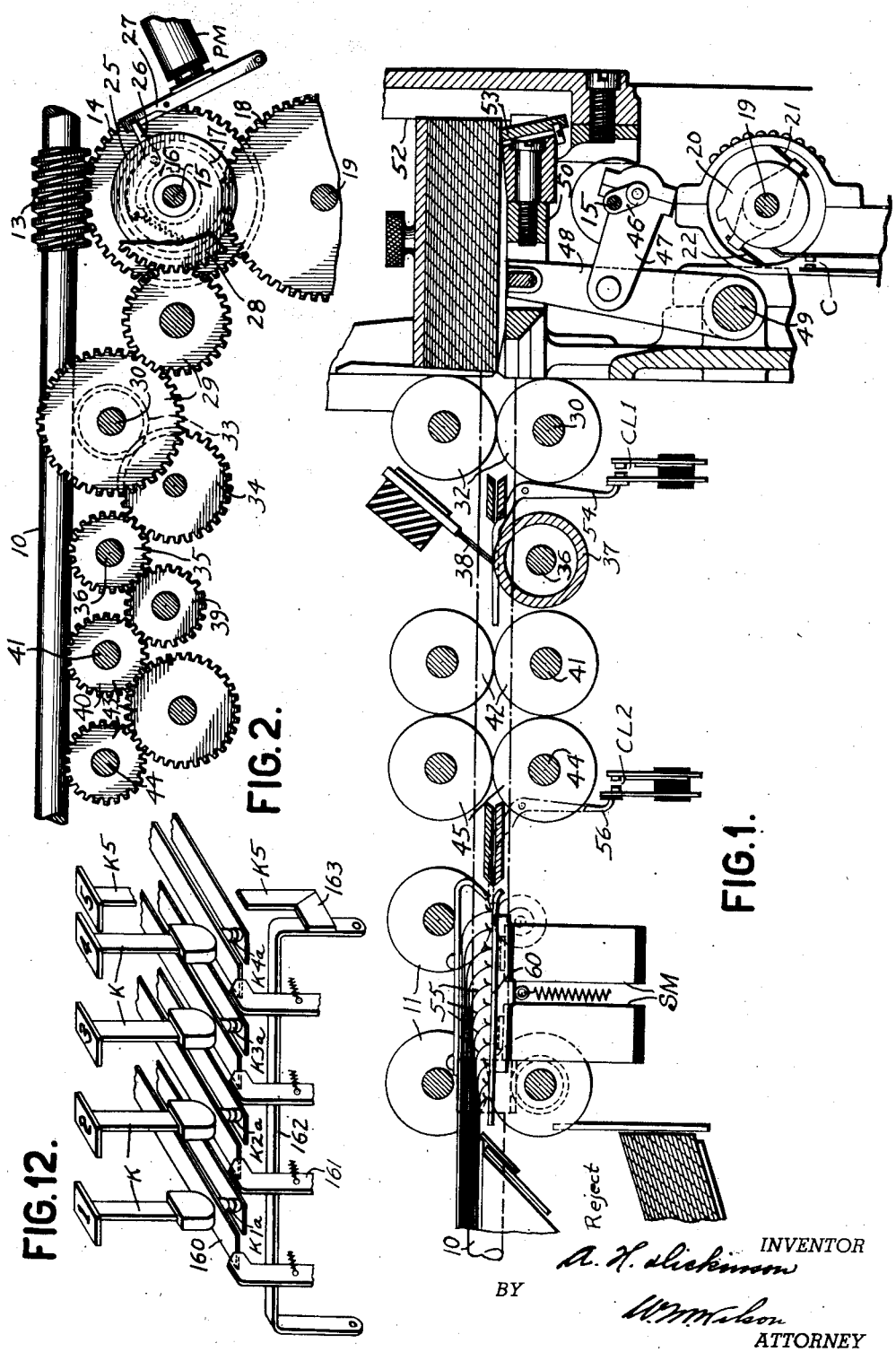
INVENTOR
A. H. Dickinson
BY
W. M. Wilson
ATTORNEY Jan. 13, 1948. A. H. DICKINSON 2,434,487
RECORD CONTROLLED ADDING AND COMPARING MACHINE
Filed Sept. 13, 1941 11 Sheets-Sheet 2

INVENTOR
A. H. Dickinson
BY
W. M. Wilson
ATTORNEY

Jan. 13, 1948.    A. H. DICKINSON    2,434,487
RECORD CONTROLLED ADDING AND COMPARING MACHINE
Filed Sept. 13, 1941    11 Sheets-Sheet 3
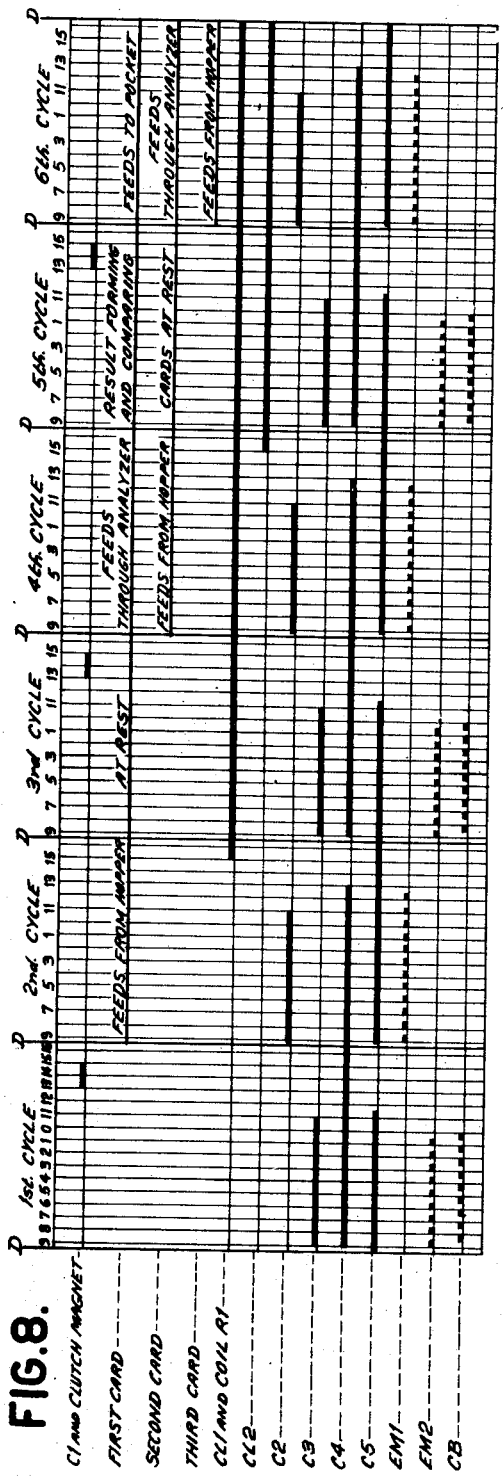
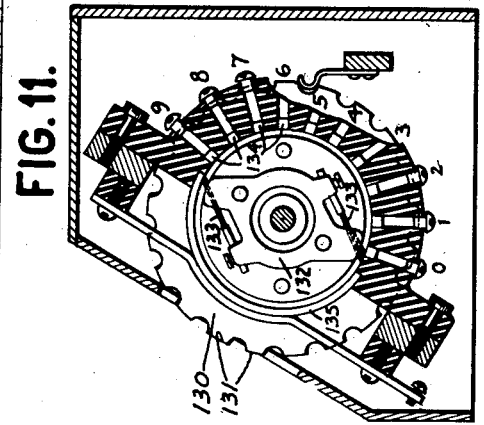
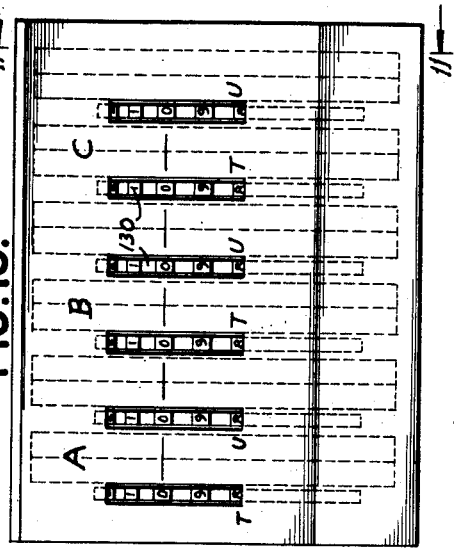
INVENTOR
A. H. Dickinson
BY
W. M. Wilson
ATTORNEY Jan. 13, 1948.  A. H. DICKINSON  2,434,487
RECORD CONTROLLED ADDING AND COMPARING MACHINE
Filed Sept. 13, 1941  11 Sheets-Sheet 4

INVENTOR
A. H. Dickinson
BY
ATTORNEY

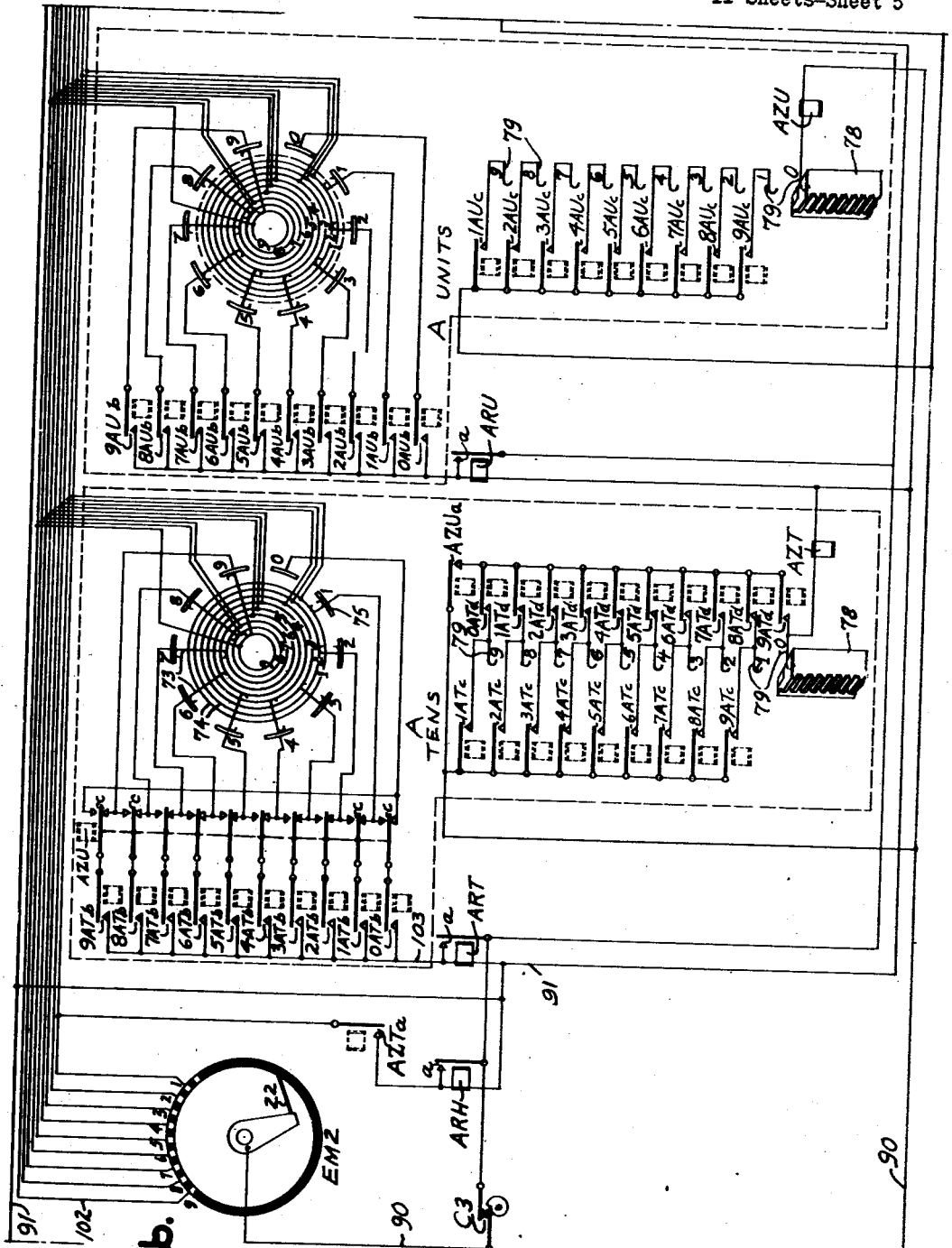

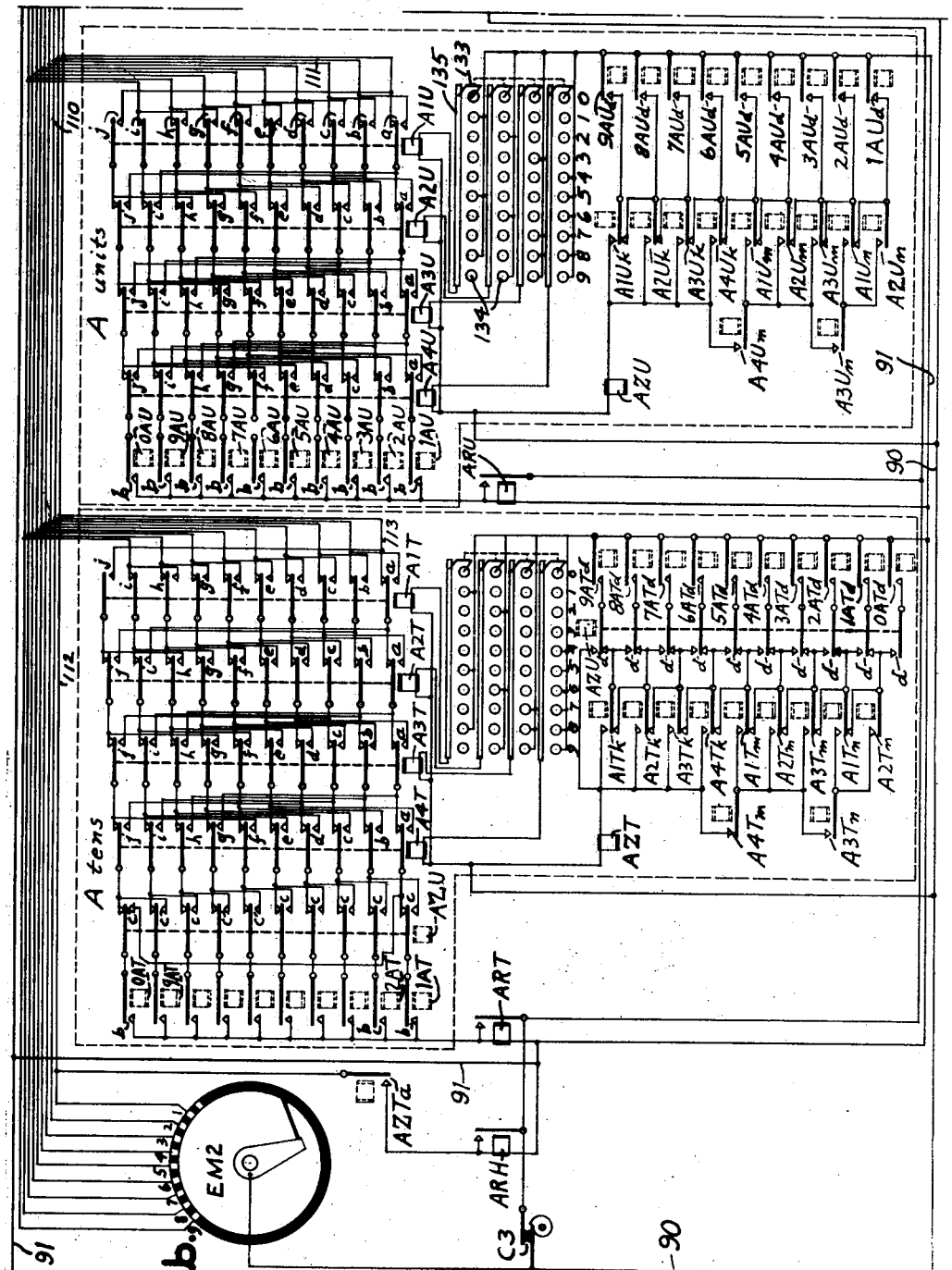

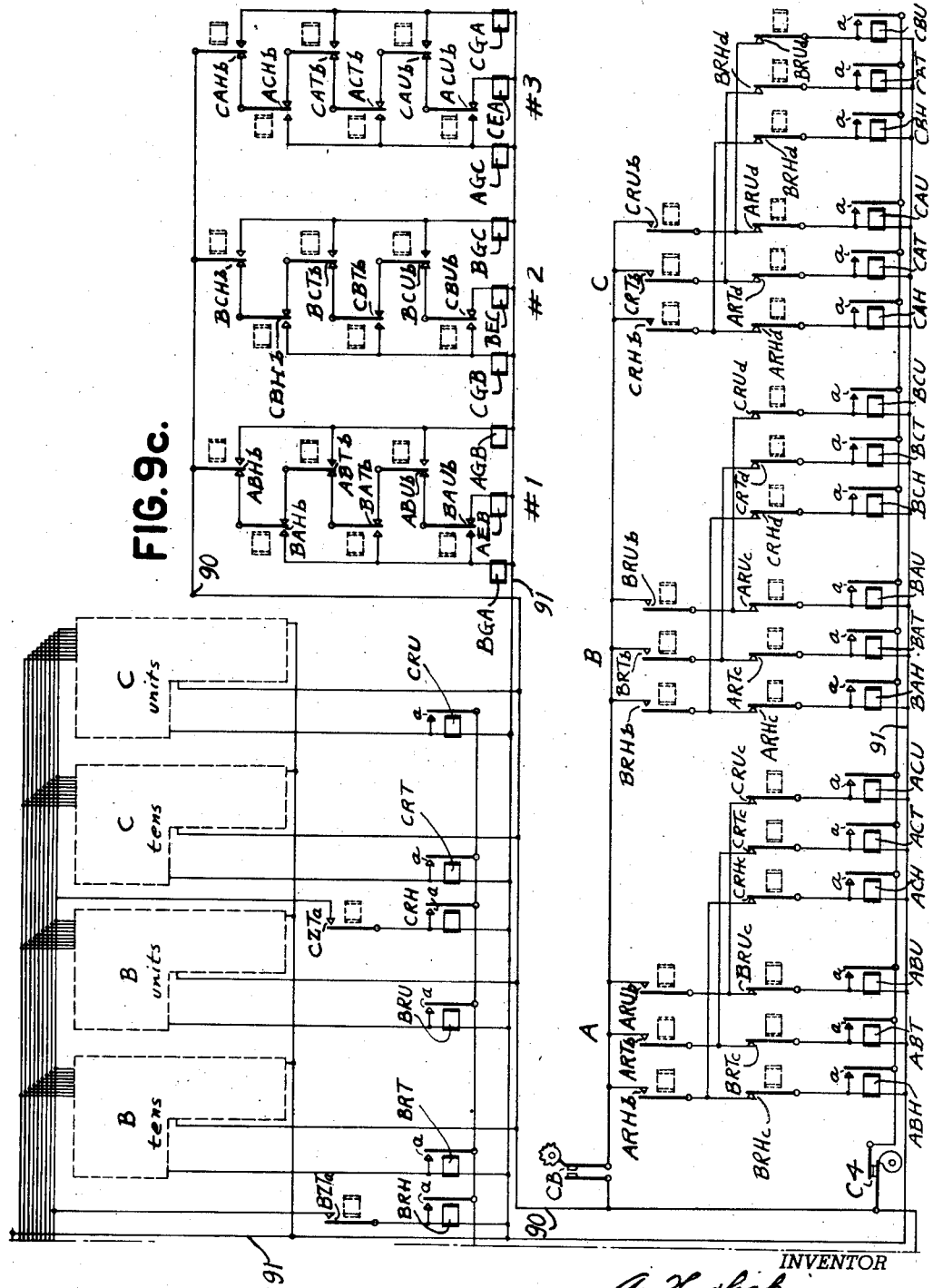

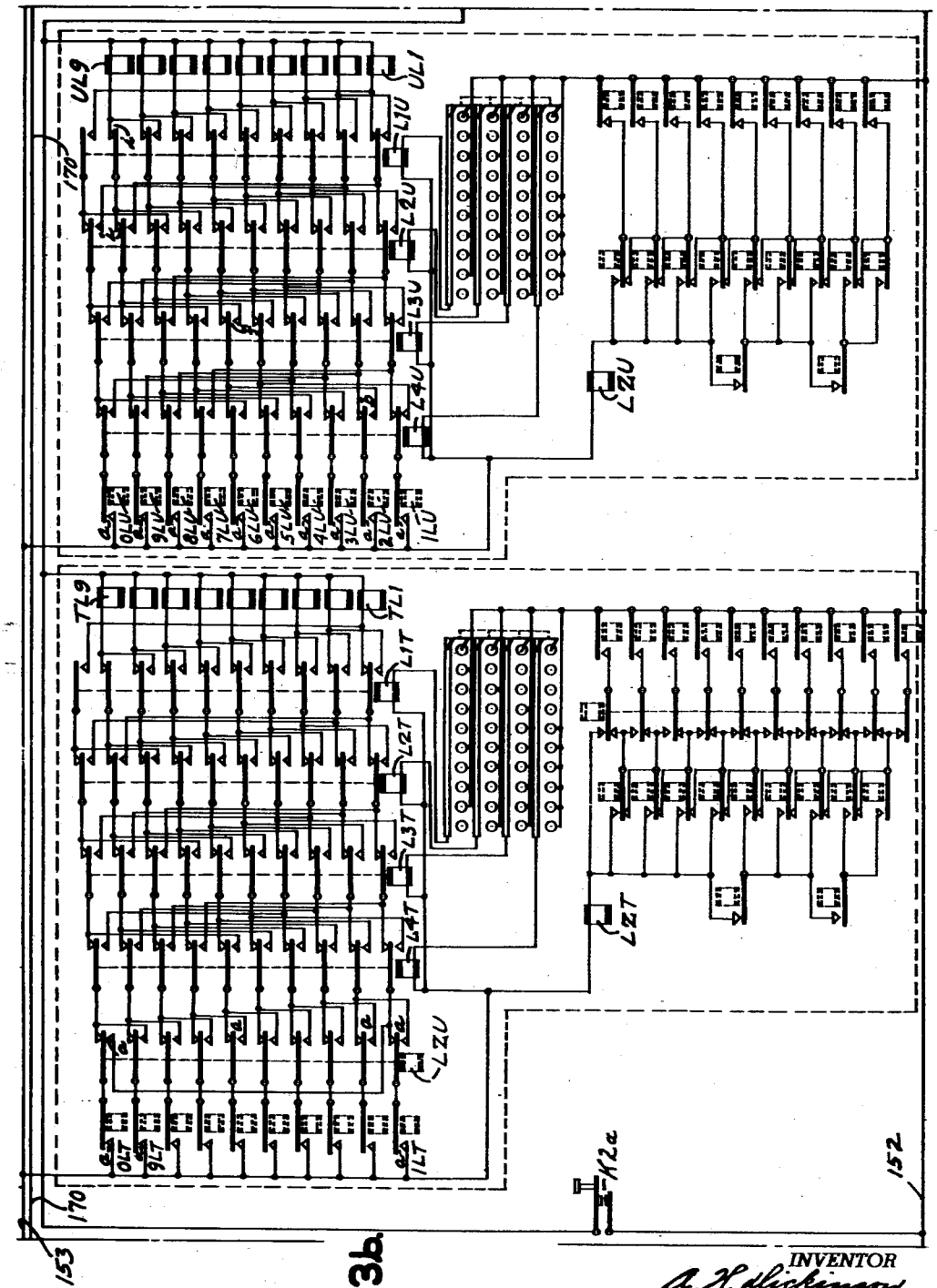

Jan. 13, 1948. A. H. DICKINSON 2,434,487
RECORD CONTROLLED ADDING AND COMPARING MACHINE
Filed Sept. 13, 1941 11 Sheets-Sheet 10

INVENTOR
A. H. Dickinson
BY
ATTORNEY

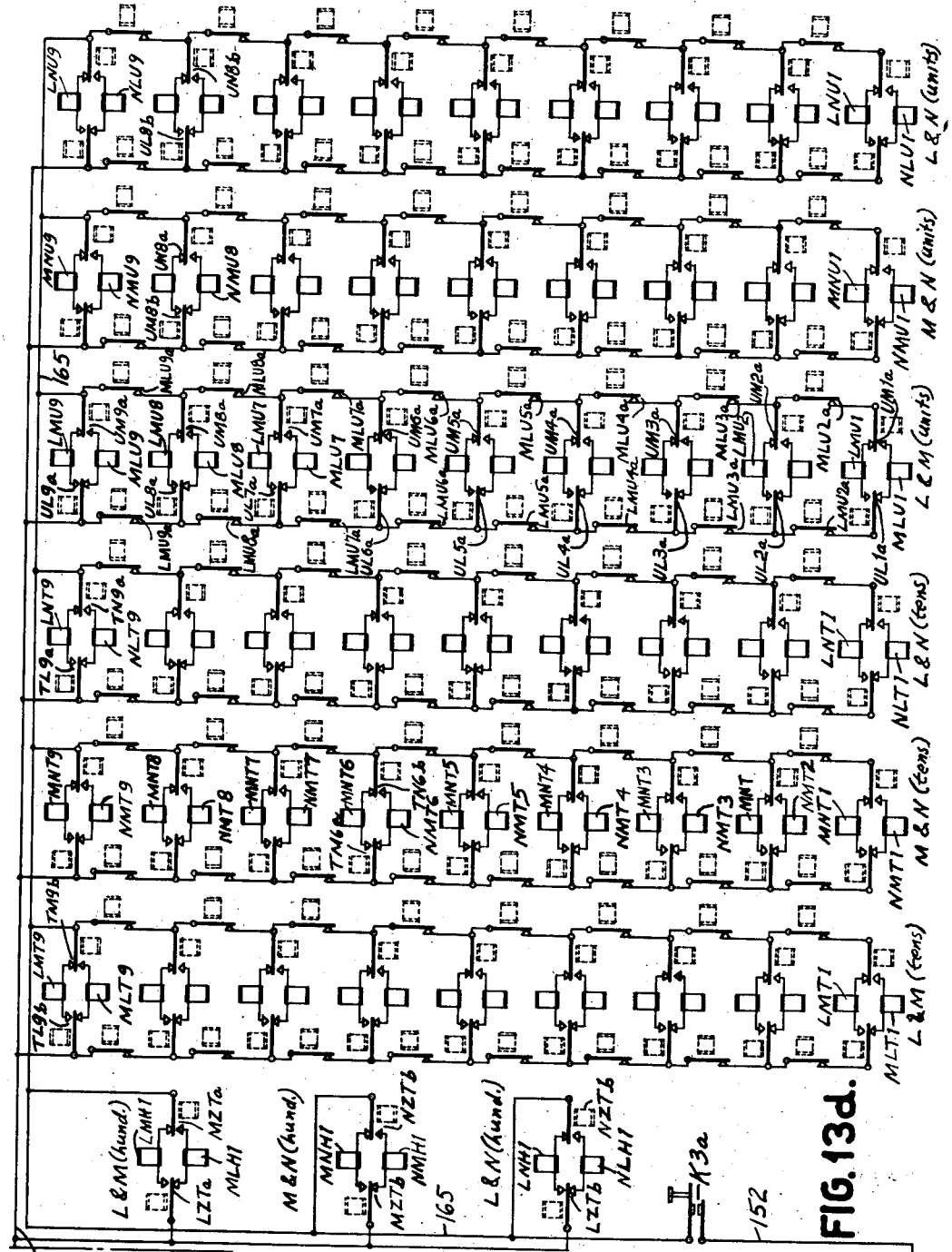

Patented Jan. 13, 1948

2,434,487

UNITED STATES PATENT OFFICE 2,434,487

RECORD CONTROLLED ADDING AND COMPARING MACHINE

Arthur H. Dickinson, Scarsdale, N. Y., assignor to International Business Machines Corporation, New York, N. Y., a corporation of New York Application September 13, 1941, Serial No. 410,716

6 Claims. (Cl. 235—61.7)

This invention relates to statistical machines for handling data bearing records and for controlling sorting means or the like to manifest statistical information.

Briefly, the present invention resides in the provision of means to combine constituent amounts derived from records with constituent amounts derived from settable source means. The source means may take either of two forms. One form provides for single differential value manifestation and includes mechanically settable carry control means. Another form provides for combinational value manifestation and the carry control means is purely electrical. The invention is disclosed in two embodiments. One embodiment has sorting apparatus and record destination or pocket selecting means. This embodiment utilizes differential timing to manifest constituent amounts designated on the records and to manifest computed results formed by combining the constituent amounts derived from the records and the settable source means.

The comparison determinations also involve differential timing as does the pocket selection according to the comparison determinations. The other embodiment lacks differential timing and derives constituent amounts from stationary records, combines these amounts with amounts set in the settable source means and compares the formed results without differential timing. The comparison determinations are manifested by selective operation of signals, such as lamps.

In both embodiments, provision is made to form and compare more than two results. As illustrative, three results are formed and compared. The results are compared order by order and then each, as a whole, is matched with each other result. The paired result determinations are then fused into a final determination in which all the results are taken into collective account; i. e., the relative magnitude of all the results is ascertained. The comparison determination may be either for maximum or minimum relations. The maximum determinations indicate or reflect the superiority of one result to each of the others or superiority of two equal results to a third result. The minimum determinations reflects in inferiority of a result to each of the others or the inferiority of equal results to a third result. In both classes of determination, the equality of all the results may be manifested.

An object of the invention is to compare more than two amounts for relative magnitude and to control the machine accordingly.

Another object is to compute a plurality of results by combining constituent amounts, as by adding them, and to compare the computed results.

Another object is to control sorting of a record in accordance with comparison of a plurality of results involving a plurality of amounts, each entering into one result, derived from the record.

Another object is to control sorting of a record in accordance with a comparison of a plurality of results involving a plurality of amounts derived from the record and a plurality of amounts derived from a presettable source means.

Another object is to control sorting of records in accordance with a comparsion of a plurality of results involving preselected amounts combined with amounts derived from each of successively handled records.

Another object is to control sorting of records in accordance with a selected one of more than two values.

Another object is to control selective operations of a machine according to a comparison of a plurality of computed results, each involving a constituent amount derived from a record.

Another object is to form and compare a plurality of computed results concurrently.

Another object is to form and compare results in accordance with differentially timed manifestations of the values of the results.

Another object of the invention is to form and compare a plurality of results in a single step of machine operations; such as a single manually initiated step or a single machine cycle.

Another object is to control a machine selectively according to minimum or maximum determinations of the relative magnitude of a plurality of amounts.

Other objects of the invention will be pointed out in the following description and claims and illustrated in the accompanying drawings, which disclose, by way of example, the principle of the invention and the best mode which has been contemplated, of applying that principle.

In the drawings:

Fig. 1 is a sectional elevation through the control portion of a sorting machine used in the main embodiment.

Fig. 2 is a detail view of clutch-driven card feed means of the sorting machine.

Fig. 8 is a timing chart of the main embodiment.

Figure 9A:
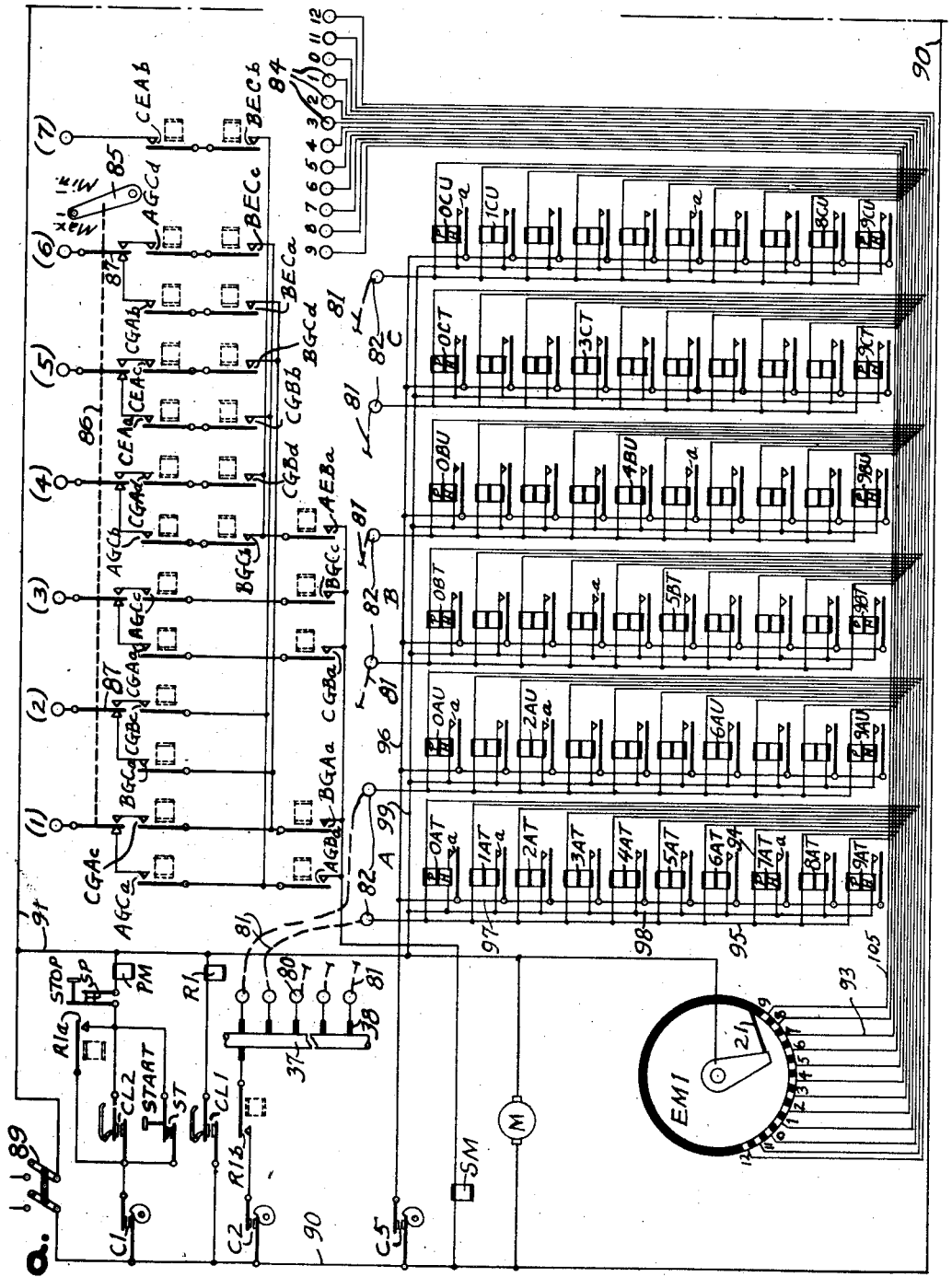

Figs. 9a, 9b, and 9c constitute the circuit diagram of the main embodiment.

Fig. 9bb is a substitute for Fig. 9b, showing the circuits of a modification of the amount selectors.

Figure 13A:
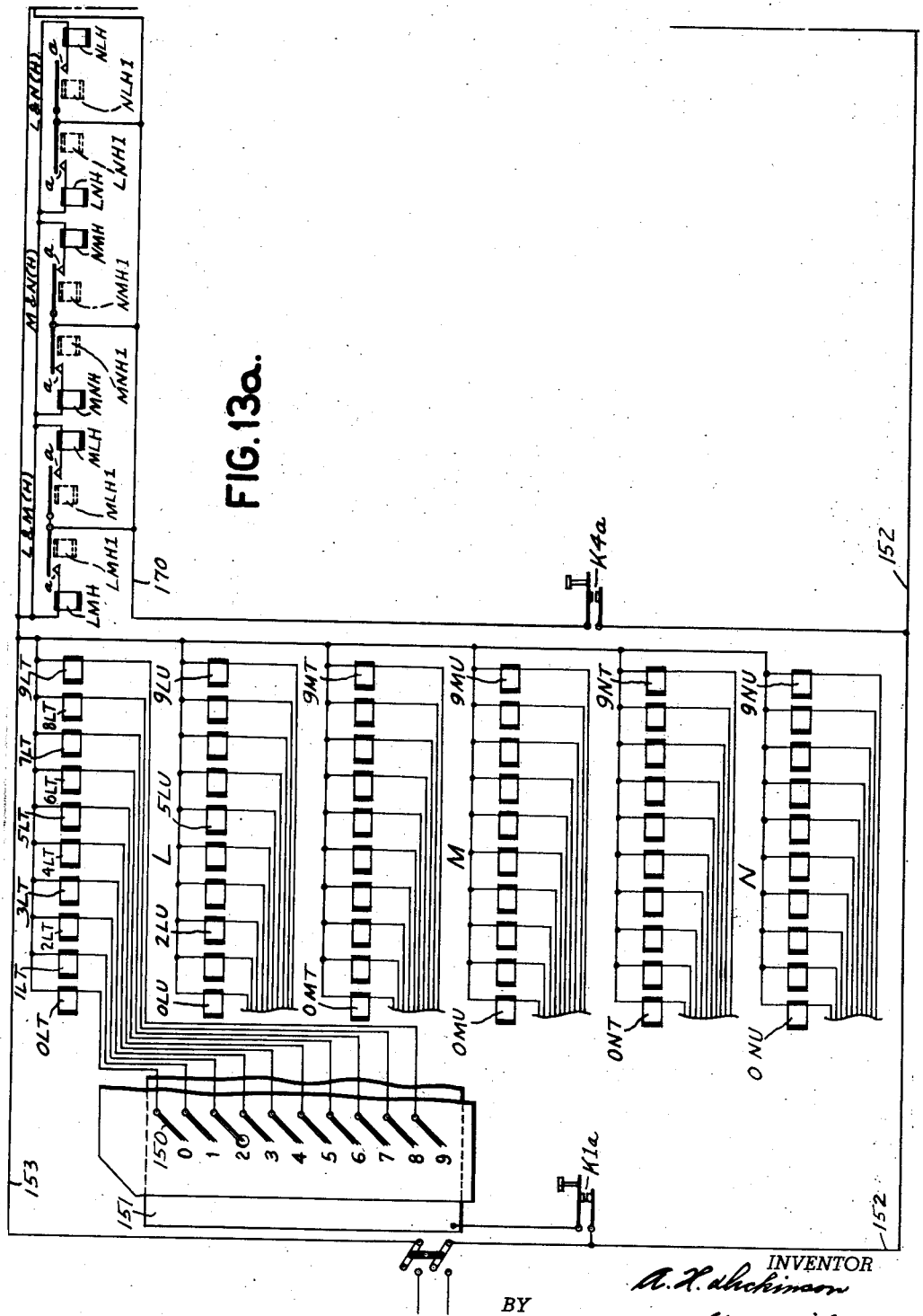

Fig. 10 is a front view of the modified selectors.
Fig. 11 is a section along lines 11—11 of Fig. 10.
Fig. 12 shows the keyboard used in a second embodiment of the invention.
Figs. 13a, b, c, and d constitute the circuit diagram of the second embodiment.

MECHANICAL CONSTRUCTION OF SORTER

The invention may be applied to any suitable sorting mechanism for sorting records to selected pockets or destinations. However, it is preferred to use a sorter structure of the general type disclosed in Patent No. 1,741,985, with such changes and additions as meet the purposes of the present invention.

Referring to Figs. 1 and 2, a motor M (shown diagrammatically in Fig. 9a) drives main shaft 10 which has the usual worm gear drive to feed rolls 11. These feed rolls operate continuously to feed cards to selected sorter pockets known in the art as the 9, 8, 7, 1 ... 0, 11, 12, and reject pockets. Only the reject pocket is shown, but it will be understood that the other pockets are disposed successively to the left of the reject pocket. It will be understood further that successive feed roll pairs such as the left hand feed roll pair 11 are provided to the left of the latter feed roll pair.

Shaft 10 has a worm 13 driving a worm wheel 14 at the rate of one revolution during a machine cycle (see Fig. 8). Worm wheel 14 (Fig. 2) is freely rotatable on a shaft 15 and is rigid with a driving clutch disk 16 having a single notch and also with a gear 17. Gear 17 meshes with a gear 18 to drive a shaft 19 carrying cams 20 for operating cam contacts generally designated C (see Fig. 8). Also carried by shaft 19 (Fig. 2) through insulation is a circuit breaker and the brushes 21 and 22 of a pair of emitters EM1 and EM2 explained fully in the subsequent circuit description and shown in Figs. 9a and 9b. The gear ratio between the drive means and shaft 19 (Fig. 2) is such that during one machine cycle, the shaft 19 makes half a revolution.

Fixed to shaft 15 is a disk 25 mounting a spring-pressed clutch dog 26 adapted to engage in the notch of continuously rotating clutch disk 16. The dog is normally latched out of engagement by latch means 27 comprising the armature of a clutch magnet PM. Energization of this magnet releases the clutch dog for engaging the notch in disk 16 at the beginning of a cycle to couple the shaft 15 to the driving means for cyclical rotation. Fixed on shaft 15 is a gear 28 serving through gearing 29 to drive a shaft 30 carrying the lower one of a pair of feed rolls 32. A gear 33 on shaft 30 drives an idler 34 meshed with a gear 35 on a shaft 36. This shaft carries a contact roll 37 coacting with sensing brushes 38 to sense electrically the designations on the record cards. Gear 35, through an idler 39 drives a gear 40 on the shaft 41 of the lower one of a pair of feed rolls 42. In turn, the gear 40 through gearing 43 drives shaft 44 of the lower one of a pair of feed rolls 45.

It is clear that shaft 15 and the parts driven thereby operate only when the shaft is clutched to the driving means, and that the clutch engagement occurs at the beginning of a cycle and terminates, upon deenergization of magnet PM, at the end of a cycle.

Shaft 15 has a crank arm 46 connected by a link 47 to an arm 48 fixed to a shaft 49. Arm 48 is pivotally connected to a slide 50 mounted below the card supply hopper 52. The rear end of the slide carries a card picker 53. A duplicate arm such as arm 48 and connected picker means may be provided to equalize the picker feed pressure.

During each cycle in which shaft 15 makes a revolution, the picker means feeds the bottom card out of the supply hopper to the feed rolls 32. These continue the feed and by the end of the cycle the card has its leading edge just under the brushes 38, meanwhile operating the card lever 54 to close card lever contacts CL1. During the next cycle in which shaft 15 is clutched to the drive means for operation, the feed rolls 33 advance the card past the sensing brushes to the feed rolls 42. Feed rolls 32 and 42 feed the card past the sensing brushes 38 to be sensed for designations. The card is advanced further during this cycle to feed rolls 45 and by the end of the second cycle of feed on a card, the card is in a position just in advance of the first feed roll 11 and of the guide blades 55. Meanwhile, during this second cycle, the card has acted on card lever 56 to close card lever contacts CL2.

The guide blades 55 are of the usual construction and lead selectively to the different card pockets. The entrance ends of the blades 55 rest on the armature plate 60 of a sorter magnet SM. During a third cycle of the shaft 15 relative to a card, the feed rolls 45 advance the card between the blades 55 and armature plate 60, and the feed rolls 11 continue the advance of the card. In a manner explained in the circuit description of the sorter embodiments, sorting magnet SM will be energized at a differential time in the cycle in accordance with the selection of a pocket to receive the card. Depending on the time of energization of the sorting magnet, the card will be under one or more of the blades 55 and will prevent them from dropping while the remaining blades will drop as the armature plate 60 is attracted downwardly by the sorting magnet. A path for the card between two blades will thus be opened and the card will be guided between these blades to the selected pocket. If the sorting magnet should remain deenergized during the cycle, the card will pass below all the blades to the reject pocket.

*The preset amount selectors*

Groups of such selectors are provided, each group provided with denominationally related orders. Each group is settable to designate an amount to be combined with an amount derived from the analysis of a field of columns of each successive record card. The card has a plurality of amount fields, each field bearing an amount to be combined with an amount preset in a related one of the group of amount selectors. The selective operation of the machine will be determined by a comparison of the results of the combinations of the preselected amounts and the amounts derived from the card fields. It is appreciated that as many groups of selectors and related amount fields on a card may be used as desired, but to simplify the explanation, only three groups of selectors and three card fields will be considered. Each group and each card field will be provided with two denominational orders, units and tens, although it will be understood that more or less denominational orders may be utilized. Throughout, the tens order will be indicated by letter T and the units order by letter U.

Two embodiments of amount preselectors are disclosed. The one shown in Figs. 3 to 7 may be considered as the main form and will be described first.

MAIN EMBODIMENT OF SETTABLE AMOUNT SELECTOR

(Figs. 3 to 7)

Three groups of selectors marked A, B, and C, each with two orders, are enclosed in housing 65. Each selector order includes a subframe of insulating material and comprising plates 66 and 67 spaced apart by a bar 68. In the space between the plates is an indicating wheel 70 mounted freely on a stud 71 extending from plate 66. The wheel 70 has ten projections 70a, each marked with one of the numerals 0 to 9. Housing 65 has a sight opening 65a for each wheel through which the numerals on the wheel may be exposed one at a time. Manual adjustment of the wheel may be effected by the operator engaging the portion of the wheel accessible through the sight opening and turning the wheel until the desired numeral comes into view. A leaf spring 72 engages the notch between a pair of projections 70a of the wheel to retain the wheel impositively in adjusted value position and center it in this position.

Wheel 70 is of insulating material and imbedded therein are nine conductive wipers 73 each having an outer contact end and an inner contact end. There is one such wiper in radial alignment with each of the different projections 70a bearing the indicating numerals 1 to 9. The inner ends of the wipers are at varying radial distances from the axis of wheel 70 to engage different concentric contact rings 74 imbedded in the plate 66. The rings may be further referred to as rings 74—1 to 9 or merely as the 1 to 9 rings.

Also imbedded in plate 66 are ten spots 75 spaced apart similarly to the spacing of the wipers and arranged in a circle concentric with rings 74 and outside the 1 ring. The outer contact ends of the wipers 73 engage different ones of these spots depending on the variable value positions of the wheel 70. Each spot corresponds to one of the values 0 to 9 which may be derived from a card column. The spots, therefore, will be referred to as the 0 to 9 spots. The following table shows the rings which are connected by their wipers to the various spots in the different value positions of the wheel 70.

Table 1

| Wheel Positions | Value Spots | | | | | | | | | |
|---|---|---|---|---|---|---|---|---|---|---|
| | 0 | 1 | 2 | 3 | 4 | 5 | 6 | 7 | 8 | 9 |
| | Rings | | | | | | | | | |
| 0 | | 1 | 2 | 3 | 4 | 5 | 6 | 7 | 8 | 9 |
| 1 | 1 | 2 | 3 | 4 | 5 | 6 | 7 | 8 | 9 | |
| 2 | 2 | 3 | 4 | 5 | 6 | 7 | 8 | 9 | | 1 |
| 3 | 3 | 4 | 5 | 6 | 7 | 8 | 9 | | 1 | 2 |
| 4 | 4 | 5 | 6 | 7 | 8 | 9 | | 1 | 2 | 3 |
| 5 | 5 | 6 | 7 | 8 | 9 | | 1 | 2 | 3 | 4 |
| 6 | 6 | 7 | 8 | 9 | | 1 | 2 | 3 | 4 | 5 |
| 7 | 7 | 8 | 9 | | 1 | 2 | 3 | 4 | 5 | 6 |
| 8 | 8 | 9 | | 1 | 2 | 3 | 4 | 5 | 6 | 7 |
| 9 | 9 | | 1 | 2 | 3 | 4 | 5 | 6 | 7 | 8 |

It may be seen from this table that as the wheel advances from one value position to the next, the successively related value rings are correspondingly brought into cooperation with the value spots. In other words, the coordination of rings to spots advances according to the wheel position.

It may be noted also from this table that the ring numbers also represent the sums of card values corresponding to the spots and of settable values corresponding to the wheel positions except that where the sum exceeds 9, the ring number is the units order digit of the sum. For example, in a manner explained later, with the wheel in position 2, the 3 spot is connected to the 5 ring, and the sum 5 will be read out if the card column bears the value 3. If the card column bears the value 8 and the wheel is in position 6, the connected 8 spot and 4 ring will be effective to read out the units order digit 4. While the values are thus combined additively, it will be understood that the invention applies to other modes of combination of the settable and card values.

As may be understood from the above, carry means is necessary where the sum of the settable value and of the card value exceeds 9. In this particular embodiment, the carry means includes a contact structure settable in accordance with and by the setting of the wheel 70. The contact structure includes a gear 77 of insulating material fixed to the wheel 70. The gear 77 meshes with a rack 78 of conductive material slidably mounted in the insulating plate 67. A series of ten contacts 79 are carried by plate 67 and arranged to engage with the bottom of the rack 78 which may be referred to as the contactor. The contacts 79 are differentiated as the 0 to 9 contacts since they are so spaced that in the 0 position of wheel 70, the contactor 78 engages the 0 contact 79, in the 1 position of the wheel, the contactor engages the 1 contact as well as the 0 contact; in the 2 position, the contactor engages the 2 contact as well as the 0 and 1 contacts, and so on. Thus, the contactor engages one or a succession of contacts, of which the last one engaged corresponds to the wheel position.

In the manner explained above, the preselectors marked A, B, and C are set to represent amounts. The amount set in each preselector will be combined with an amount derived from one of three amount fields of a card to form an aggregate value result. Three such aggregate results will be formed, each being the combination result of a constituent amount derived from an amount field and a constituent amount derived from a related preselector. These aggregate results will be compared, each with the others, and the comparison will determine differential operations of the machine. In the main embodiment of the invention, the differential operations controlled by the comparison are card sorting selections utilizing the sorting means described before. The following explanation deals with the operation of the main embodiment employing the sorting machine and preselectors A, B, and C of Figs. 3 to 7.

CIRCUITS AND OPERATION OF MAIN EMBODIMENT

(Figs. 9a, 9b, 9c and Fig. 8)

Each of the cards to be operated on has three amounts designated in three card fields. The code used for designating values is the known Hollerith code according to which a single perforation in one of the index positions 9 to 0 of a card column represents the corresponding digital value. In the present illustrative case, each amount field has two denominational order columns. The brushes 38 for sensing the amount columns are wired to so-called brush sockets 80 (Fig. 9a). Suitable plug wire connections 81 are made between these sockets 80 and sockets 82 of three groups of value relays. Thus, any three amount fields may be associated with the three value relay groups, and the amounts sensed in the card fields will be entered in the associated relay groups. These card amounts enter as constituents in the computed results obtained by combining the card amounts with the amounts preset in selectors A, B, and C (Figs. 3 to 7). For convenience, the amounts derived from the cards and the related card fields and associated relay groups may be differentiated by letters A, B, and C according to their association with preset amounts and selectors A, B, and C. Likewise, the results, of which the card amounts and the presettable amounts are constituents, may be referred to as results A, B, and C; e. g., result C is the combination of the amount in card field C and the amount set in the preselector C. Each socket 82 (Fig. 9a) is common to one order of value relays. There are ten relays in each order corresponding to the digital values 0 to 9. Each relay includes a duo-wound magnet having a pickup coil and a holding coil, respectively identified by letters P and H. The relay magnet is designated by the value to which it corresponds, the letter of its group, and the order identifying letter; e. g., 2AU is the 2 value magnet in the units order of group A. The relay contacts operated by a magnet are designated by the reference designation of the magnet followed by a small letter; e. g., 2AUa.

Two classes of comparison determinations of the results A, B, and C may be effected. One class is referred to as the maximum class and the other as the minimum class. Seven comparison determinations are possible in each class. In the maximum class, these are (1) Result A largest (2) result B largest (3) result C largest (4) results A and B equal and larger than C (5) results A and C equal and larger than B (6) results B and C equal and larger than A (7) results A, B, and C equal. In the minimum class, the seven determinations are: (1) Result A smallest (2) result B smallest (3) result C smallest (4) results A and B equal and smaller than C (5) results A and C equal and smaller than B (6) results B and C equal and smaller than A (7) results A, B, and C equal.

The seven possible comparison determinations are adapted to be read out to control machine operation selectively by circuits including plug wire connections (not shown) between seven sockets, designated (1) to (7) in Fig. 9a to correspond to the determinations listed above, and selected sockets 84. Sockets 84 relate to different sorting pockets 9 to 0, 11, and 12, as indicated adjacent the sockets in Fig. 9a. Any one or more of the pockets may be preselected to receive the cards in accordance with desired comparison determinations by connecting plug wires (not shown) between sockets 84 corresponding to the desired sorting pockets and one or more of the sockets (1) to (7). When none of the comparison determinations desired to cause sorting of a card to the preselected pockets is established by the machine, the card will be directed to the reject pocket.

Either the maximum or minimum class of comparison determinations may be chosen to control selective machine operations by setting a switch handle 85 (Fig. 9a) in the correspondingly designated position. Handle 85 operates a bar 86 common to shiftable switches 87, each wired to one of the sockets (1) to (6). When the handle 85 is in "maximum" (Max.) position, the left-hand sides of switches 87 are closed for causing the maximum class of comparison determinations to be read out. When the handle is in "minimum" (Min.) position, the right-hand sides of switches 87 are closed for causing the minimum class of comparison determinations to be read out. Socket (7) has no switch 87 associated therewith because with results A, B, and C equal, it is immaterial whether the setting is for maximum or minimum determination.

Let it be assumed that handle 85 is in "maximum" position so that the maximum class of comparison determinations are to be read out. Assume, further, that sockets (1), (2), and (3) are connected by plug wires to sockets 84—8, 6, and 1. Accordingly, a card will be sent to the 8 pocket if the result A is largest, to the 6 pocket if result B is largest, and to the 1 pocket if result C is largest.

Having plug-connected brush sockets 80 to card value relay sockets 82 and the selected sockets of group (1) to (7) to the selected socket 84, and, further, having set the preselectors A, B, and C to the desired preselected amounts and placed a stack of cards to be operated on in the supply hopper 52 (Fig. 1), the machine is ready for operation.

The operator first closes line switch 89 (Fig. 9a) to supply voltage to opposite lines 90 and 91. Motor M, directly across these lines is set in operation and continuously drives feed rolls 11 and clutch disk 16 (Fig. 1).

The operator then depresses the start key to close key contacts ST (Fig. 9a). When cam contacts C1 close, a circuit is completed therethrough and through the contacts ST and SP to energize feed clutch magnet PM (also see Fig. 2). It will be observed from the timing chart (Fig. 8) that cam contacts C1 close briefly during alternate machine cycles. Accordingly, the operator will hold the start key down for at least two cycles to insure the completion of the start key circuit through the feed clutch magnet. The first cycle shown in Fig. 8 is the one in which contacts C1 close and the feed clutch magnet circuit is completed through these contacts, the start key contacts ST, and stop key contacts SP. Energization of the feed clutch magnet causes the shaft 15 (Fig. 2) to be clutched to continuously rotating clutch disk 16 at the beginning of the second cycle. Accordingly, the first card will feed out of the supply hopper and by the end of the second cycle will be just under the sensing brushes 38 (Fig. 1), meanwhile closing card lever contacts CL1. Closure of contacts CL1 energizes a relay coil R1 (Fig. 9a). Coil R1 closes contacts R1a shunting the start key contacts; hence, the start key may now be released. At the end of the second cycle, the card feed will stop because contacts C1 do not close during this cycle. The card, therefore, will remain in the position which it reached at the end of the second cycle. During the third cycle, closure of cam contacts C1 occurs again and magnet PM is again energized, causing feed of the card to resume at the beginning of the fourth cycle. During the fourth cycle, the first card moves past brushes 38 and is fed to a position in which its leading edge is just in advance of the entrance ends of guide blades 55 (Fig. 1), meanwhile closing card lever contacts CL2. These contacts are in parallel with relay contacts R1a (Fig. 9a) and together with contacts C1 will close a circuit through magnet PM to feed the last card (after contacts CL1 and coil R1 become ineffective) to the continuously rotating feed rolls 11 which will feed the last card to the selected pocket.

It is evident that with the cam contacts C1 closing only during alternate cycles, the card feed operating under control of clutch magnet PM will occur automatically every other cycle. Thus, during the second cycle which is the first in which feed of a card from the hopper occurs, the card will reach the brushes 38; during the third cycle relating to the card, it will dwell in this position; during the fourth cycle relating to the card, it will be fed, analyzed and reach a position in advance of guide blades 55; during the fifth cycle relating to the card, it will remain at rest, and during the sixth cycle relating to the card, it will be fed to the continuously rotating rolls 11 which will feed the card to the selected pocket. The timing chart, Fig. 8, shows six cycles during which three cards are acted on, the first cycle being the one in which clutch magnet PM is energized to prepare for feed of the first card from the hopper during the second cycle. It will be seen that while one card is feeding to the sorting blades and to the selected pocket, the next card is advancing through the analyzer and a third card is feeding out of the hopper. Card lever contacts CL1 remain closed under the influence of successive cards until the last card has passed the analyzer comprised of brushes 38 (Fig. 1) and contact roll 37. Card lever contacts CL2 remain closed under the influence of successive cards until the last card passes into the area of the sorting guide blades 55.

During the fourth machine cycle (Fig. 8), the first card is moved through analyzer 37—38 and the constituent amounts in the card fields A, B, and C are read out and entered in the value relay groups A, B, and C. The readout circuits for each column designation of a value are similar and a circuit will be traced for only one value designation. Assume, for example, that the tens order column of card field A is perforated in the 7 index position, designating value 7. At the "7" cycle point of the fourth cycle, the 7 perforation is under the brush 38 and the following circuit is completed (Fig. 9a):

*Analyzing and readout circuit.*—From line 91, the brush 21 and 7 spot of emitter EM1, the wire 93, the wire 94 branching off therefrom, through the pickup coil P of value magnet 7AT, the common line 95 of the tens order of group A, connected socket 82, the plug wire 81 to the socket 80 of the brush 38 for sensing the tens order column of field A, the common contact roll 37 engaged by the brush through the 7 perforation, relay contacts R1b (closed by previously energized coil R1), and via cam contacts C2 to line 90.

Energization of the pickup coil P of magnet 7AT closes its *a* contacts to complete a circuit through the companion holding coil H of this magnet as follows: Line 90, cam contacts C5, common relay line 96, common line 97 of the tens order of group A, contacts *a* of magnet 7AT, thence through the coil H of magnet 7AT, common wire 98, and via common relay line 99 to circuit line 91.

Through similar analyzing and holding circuits such as traced above, the sensing during the fourth cycle of the value designations in the remaining columns of the amount fields of the first card causes operation of the related relay magnets. Thus, if the card amounts are 27 in field A, 51 in field B, and 86 in field C, the following magnets are operated: 2AT, 7AU, 5BT, 1BU; and 8CT and 6CU. At the end of the fourth cycle, the feed of the first card stops and it remains at rest during the fifth cycle, with its leading edge just in front of the sorting guide blades 55 (Fig. 1).

The cam contacts C5 in the circuits of the holding coils of the operated value relay magnets remain closed until the 11th cycle point of the fifty cycle, and the holding coils, accordingly, remain energized until then. While the card is at rest during the fifth cycle, the card amounts now represented by the energizing holding coils of the relay magnets will be added to the preselected amounts in the preselectors to form results A, B, and C. During the same period, the results will be compared to determine which, if any, is the dominating result, and to select a cord pocket accordingly.

Assume the preselector A is set to amount 71. The relationship of rings 74 to value spots 75 of the preselector orders in the wheel positions for which they are set may be understood from Table 1, supra. The manner in which the results are formed when carries are not involved will now be explained with reference to result A.

With the tens order wheel of selector A in the 7 position, the coordination of rings to spots has advanced seven increments from zero wheel position, and rings 7, 8, 9, and 1 to 6 are connected, respectively, with spots 0, 1, 2, and 4 to 9. With the units order wheel of selector A in the 1 position, the ring relationship to the spots has advanced one increment and rings 1 to 9 are connected with spots 0 to 8, respectively.

As shown in Fig. 9b, each of the value spots 75 of an order is in circuit with the normally open relay contacts *b* of the corresponding card value relay magnet of the related order of the value relays. Thus, in accordance with which of the card value relay magnets of the corresponding order has operated to close its *b* contacts, one of the value spots will be connected into the circuit or rendered active. The active value spots 75, therefore, may be said to represent the card values. In the assumed example, card field A bears amount 27. Hence, the holding coils H (Fig. 9a) of magnets 2AT and 7AU are energized and contacts 2ATb (Fig. 9b) and 7AUb are now closed, rendering value spots 2 and 7 of the tens and units order of preselector A active. Since the tens order of preselector A is set in wheel position 7, the 9 ring is in cooperation with the active 2 spot. With the units order of preselector A set in 1 position, the active value spot 7 is in cooperation with the 8 ring.

During the fifth cycle, while the first card is at rest, the brush 22 of emitter EM2 (Fig. 9b) successively wipes the emitter spots 9 to 1 at the indicated cycle points (see also Fig. 8). When the emitter brush 22 (Fig. 9b) engages the 9 emitter spot, the following circuit is completed:

*Tens order of result a forming circuit.*—Line 90, the brush 22 and spot 9 of emitter EM2, the line 102, the 9 ring of the tens order of preselector A, the wiper 73 of this ring, the value spot 75—2 of this order, the lower, normally closed side of one of the column of *c* contacts of a carry relay magnet AZU, thence through the now-closed contacts 2ATb, common wire 103, a relay coil ART, and to line 91.

Similarly, the units order of result A is formed by a circuit completed via the 8 spot of emitter EM2, ring 8 and spot 75—7 of the units order of preselector A, and via the now-closed contacts 7AUb through coil ARU to line 91. There are no carry relay contacts in the units order result forming circuits since no carry may be effected to the lowest order. It is to be noted that result coils ART and ARU are energized at the "9" and "8" cycle times corresponding to the sums of the tens and units order values of preset amount 71 in selector A and designated amount 27 in card field A.

In a similar manner, the B and C results are formed when no carries are involved. When the sum of the units order values of constituent amounts exceeds 9, the result sum of the tens order must include the carry value, and when the sum of the tens order values exceeds 9, a hundred order result will be formed comprising the carry value. The carry conditions are determined in advance of the result forming operations so that the results as read out and formed will include the carries. Assume, for example, that preselector A is set to amount 96 and card field A of the first card bears amount 97.

Figure 3:
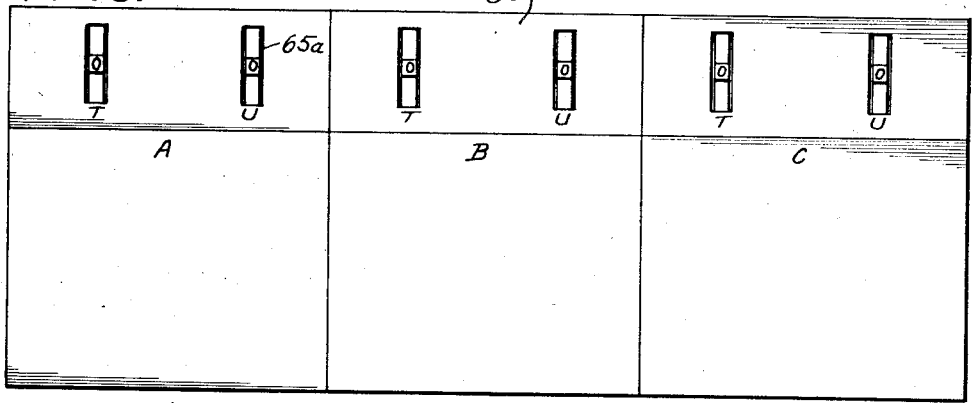
Fig. 3 is a front view of amount selectors of the main form.
Figure 4:
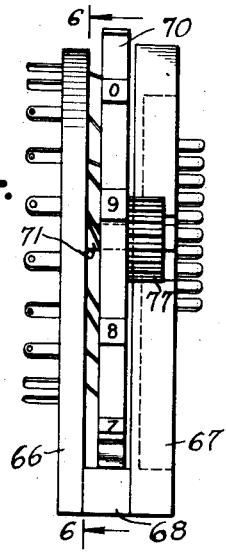
Fig. 4 is an end view of one order of these selectors.
Figure 5:
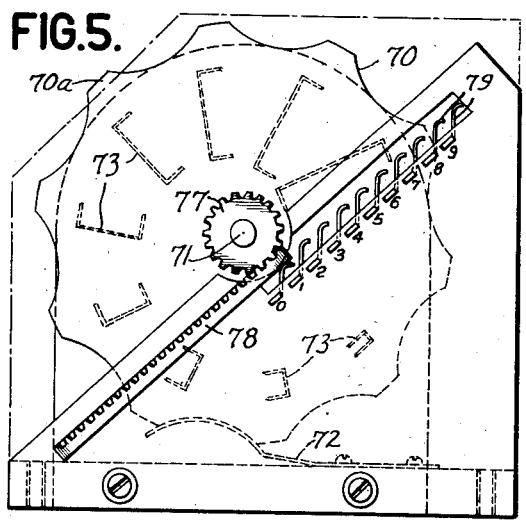
Fig. 5 is a side view of this selector order.
Figure 6:
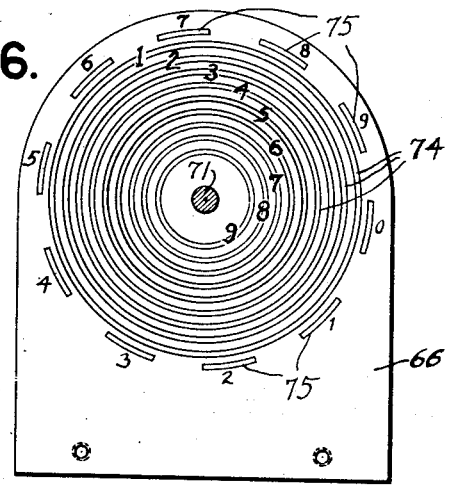
Fig. 6 is a section along lines 6—6 of Fig. 4.
Figure 7:
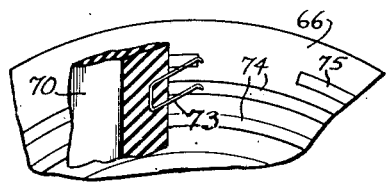
Fig. 7 is a detail perspective of contact means of a selector order.

The carry means of each order of a preselector includes the contactor 78 and the ten contacts 79 shown in Fig. 5. As explained before in the description of the preselectors, contactor 78 engages the 0 contact 79 when the wheel 70 is in 0 position, the 0 and 1 contacts when the wheel is in 1 position, and so on. Referring now to Fig. 9b, with preselector A set to 96, contactor 78 of the units order will bridge contacts 79—0 to 6 and contactor 78 of the tens order will bridge contacts 79—0 to 9. During analysis of the first card in the fourth cycle, amount 97 in field A will be sensed and cause energization of magnets 9AT and 7AU (Fig. 9a). Magnet 7AU will close contacts 7AUc (Fig. 9b) and magnet 9AT (Fig. 9a) will close contacts 9ATc (Fig. 9b). A circuit is completed in the units order from line 91 via carry coil AZU, the 0 contact 79, the contactor 78, and via the 3 contact 79 and relay contacts 7AUc, to line 90. Similarly, a circuit is completed in the tens order from line 91 through carry coil AZT via the 0 contact 79, the contactor 78, the 1 contact 79, and the 9ATc contacts to line 90.

It will be noted that the circuit of a carry coil will be established through the carry contact 79 and the c value relay contacts corresponding to the values which add up to 10. If a preselector order is set in any position corresponding to a value which, added to the card value, equals or exceeds 10, then the contactor 78 will always form a bridge between the 0 contact 79 and at least the contact 79 corresponding to the tens complement of the card value.

Coil AZU, upon energization, shifts the c contacts of the A result forming circuits of the tens order. Thereby, the contacts 0ATb to 8ATb are connected to value spots 75—1 to 9 instead of to spots 75—0 to 8 to which they are normally connected. Also, contacts 9ATb are thereby connected to value spot 75—0. In the example under discussion, the tens order of preselector A is set to value 9 and ring to spot relation has advanced nine steps from zero wheel position relation, as indicated in Table 1, supra. Since, in the present example, the tens order of card field A bears value designation 9, contacts 9ATb are closed. Further, since the units order of preselector A is set to 6 and the units order of card field A bears value 7, carry coil AZU is energized. Hence, closed contacts 9ATb are connected by the upper side of the associated, shifted carry contacts c of coil AZU to value spot 75—0. In the 9 wheel position of the tens order of preselector A, now active value spot 75—0 is connected by a wiper 73 to the 9 ring 74. It may be noted that ring 9 corresponds to the sum of the tens order value 9 in preselector A and value 9 designated in the tens order of card field A plus the carry unit value. Accordingly, during the result forming cycle, result 9 will be read out of the tens order. In the units order, wheel 70 is set to 6 and field A bears value 7. Accordingly, contacts 7AUb are closed. These contacts are in series with value spot 7. This value spot, in the 6 wheel position, is connected to the 3 ring. Hence, during the result forming cycle, units order result 3 will be read out. Further, since the tens order values of preselector A and card field A exceed 9, carry coil AZT has been energized. Contacts AZTa are closed to connect hundreds order result magnet ARH to the 1 emitter spot of emitter EM2. Thus, by the end of the fourth cycle (Fig. 8), when the analysis of the first card has been completed, contacts 9ATb are closed and connected through the shifted side of a pair of contacts c of coil AZU to spot 0 which in the 9 wheel position is connected to ring 9; contacts 7AUb are closed and connected to spot 7 which in the 6 wheel position is connected to ring 3, and contacts AZTa are closed to connect the coil ARH to emitter spot 1 of emitter EM2. During the fifth cycle, as brush 22 of emitter EM2 wipes emitter spots 9 to 1, coil ARU will be energized at the 3 time, coil ART will be energized at the 9 time, and coil ARH will be energized at the 1 time. It will be seen that the differential energization times 1, 9, and 3 of coils ARH, ART, and ARU correspond to the sum 193 of preselected amount 96 and card amount 97.

If the units orders of preselected and card amounts add up to 10 or more and the tens orders add up only to 9, coil AZU will be energized, but coil AZT will not be energized through a circuit extending through a c contact of the card value relay coil. Instead, coil AZT will be energized through an alternative circuit. For example, assume the card field A has designated value 27 and preselector A is set to 74. Coil AZU will be energized, as before, via the 3 contacts 79 and the contacts 7AUc. Coil AZU will not only shift the column of c contacts in the tens order result forming circuits, but will also close contacts AZUa, connecting the circuit line 90 to the common sides of value relay contacts 0ATd to 9ATd. According to the example, magnet 2AT (Fig. 9a) is energized and contacts 2ATd (Fig. 9b) are closed. With the tens order of preselector A in 7 wheel position, contactor 78 is bridging contacts 79—0 to 7. With closure of contacts AZUa, a circuit is completed from line 90 via contacts AZUa, 2ATd, 79—7, contactor 78, contacts 79—0, and through coil AZT to line 91. Coil AZT closes its contacts AZTa to prepare coil ARH for energization at the "1" time of the fifth cycle.

Since the result forming circuits, including the carry circuits, for results B and C are similar to those for result A, they are not shown in detail but are indicated diagrammatically in Fig. 9c as contained in the dotted outlines. During the same cycle in which result A is formed and in the same manner, results B and C will be formed to energize the B result coils BRT and U and C result coils CRT and U, and if carry in the tens orders is indicated, contacts BZTa and CZTa will be closed and result coils BRH and CRH energized.

Upon energization of a result coil, its a contacts close to form a stick circuit for the coil extending also through cam contacts C3 (Fig. 9b) to line 90.

In further explanation, assume an example in which card fields A, B, and C contain amounts 27, 51, and 86 and selectors A, B, and C contain amounts 71, 25, and 18. During the fourth cycle, as a result of analysis of the card fields, magnets 2AT, 7AU; 5BT, 1BU; and 8CT, 6CU are energized. During the next cycle, while the card is at rest, the result coils are energized at differential times, thus:

| | |
|---|---|
| 9 time | Coil ART |
| 8 time | ARU |
| 7 time | BRT |
| 6 time | BRU |
| 4 time | CRU |
| 1 time | CRH |

The energization of the result coils at the indicated differential times manifests result A as 98, result B as 76, and result C as 104. The result value manifestations are instantaneous since they are dependent upon the transient differential times at which the result coils are energized. The instantaneously formed results are compared concurrently with their formation at the differential times and their relative magnitude ultimately determined. The comparing means includes individual order comparing means and combined order comparing means. In the lower part of Fig. 9c, sections A, B, and C are the individual order comparing sections. In the upper right-hand portion of this figure, sections #1, #2, and #3 are the combined order comparing sections. Section A determines the magnitude of the values in the individual orders of result A with respect to the values in the corresponding orders of results B and C. Section B determines the relation of values in the orders of result B to the values in the orders of results A and C. Section C compares the values in the orders of result C individually with the values in the orders of results A and B. Each section has normally open $b$ contacts of the result coils of the result corresponding to the section identification. These $b$ contacts are connected through normally closed $c$ or $d$ contacts of the other result coils to two sets of order comparing coils, each set relating to the magnitude of the result corresponding to the section identification to one of the other results.

The designations of the order comparing coils have as the first letter the symbol of the result which is greater than the result indicated by the next letter, while the last letter U or T is the order indicating letter. For instance, in section A, coil ABH is the coil energized if result A is greater than result B in the hundreds order. In section A, the set of comparing coils ABH, T, and U relate to result A orders being greater than orders of result B and the set of comparing coils ACH, T, and U relate to domination of result A orders over result C orders. In section B, comparing coils BAH, T, and U and BCH, T, and U relate to domination of result B over results A and C, respectively. In section C, coils CAH, T, and U and CBH, T, and U relate to domination of result C over results A and B, respectively. If the section result is greater in an order than the corresponding order of another result, the comparing coil relating to domination of this order of section result to the other result will be energized. Thus, in section A, if result A is greater in the tens order than result B in the tens order, then contacts ART$b$ will close while contacts BRT$c$ still are closed, and a circuit will be completed via these contacts and circuit breaker contacts CB through comparing coil ABT. If the section result is equal in an order to another result in the same order, the related $b$ and $c$ or $d$ contacts of the result coils close and open, respectively, at the same time, and the associated comparing coil remains unenergized. If the section result is less in an order than the same order of another result, the $b$ contacts close after the $c$ or $d$ contacts have been opened, and the related comparing coil remains unenergized. Thus, an order comparing coil of a section will be energized only if the section result is greater in an order than the corresponding order of the compared result.

In the selected example, result coils ART and ARU were energized at "9" and "8" of the fifth cycle, coils BRT and BRU at "7" and "6," and coils CRH and CRU at "1" and "4." Accordingly, in section A, coils ABT, ABU, ACT, and ACU are energized at the "9" and "8" times of the fifth cycle. In section B, coils BCT and BCU are energized at the "7" and "6" times. In section C, coils CAH and CBH are energized at the "1" time.

Upon energization of an order comparing coil, it closes its $a$ contacts to provide a stick circuit extending also through cam contacts C4, to line 90. By the end of the "1" time of the fifth cycle; i. e., the result forming and comparing cycle concerned with the first card, the comparing coils indicating domination of the section results to the other results have been energized and will be held until "13" of the next (6th) cycle, at which time the cam contacts C4 open.

The order comparing coils thus far described relate to individual order comparisons of the results. These separate order comparisons are combined to provide an all-order comparison between each pair of results. The circuit elements shown in sections #1, #2, and #3 of Fig. 9c effect this comparison. Each of these sections has three comparing coils. The designations of the coils are chosen to symbolize the conditions under which they are energized. The first letter of the designation refers to the result, as a whole, which is greater than or equal to the result indicated by the last letter. A middle letter G symbolizes "greater than" while a middle letter E symbolizes equality. For instance, in section #1, coil BGA will be energized when result B, as a whole, is greater than result A, as a whole.

In the example under discussion, where the results are A: 98, B: 76, and C: 104, order comparing coils ABT and ABU, ACT and ACU, BCT and BCU, and CAH and CBH all are energized before the end of the "1" time of the fifth cycle.

In section #1, energized coils ABT and ABU have shifted contacts ABT$b$ and ABU$b$. The contacts ABH$b$, BAH$b$, BAT$b$, and BAU$b$ remain in unshifted condition. Accordingly, upon closure of contacts ABT$b$ at the "9" time, a circuit is completed from line 90, via the normal side of contacts ABH$b$, the normal side of contacts BAH$b$, the shifted side of contacts ABT$b$, and through coil AGB to line 91. With contacts ABT$b$ shifted, the connection from line 90 to coil AEB is broken and the coil is deenergized. Further, the shifting of contacts ABT$b$, with contacts BAH$b$ in normal condition, prevents closure of a circuit through coil BGA. Had the hundreds order relay contacts BAH$b$ been shifted and the corresponding order relay contacts ABH$b$ remained normal, as would be the case if the B result were higher in the hundreds order than the A result, then the circuit of coil BGA would have been made through shifted contacts BAH$b$. With the hundreds order contacts BAH$b$ and ABH$b$ both normal, the all-order comparison determination depends on the tens and units order relations of results A and B. If the tens order value of result B were greater than the tens order value of result A, contacts BAT$b$ would be shifted and contacts ABT$b$ normal. Coil BGA then would be energized by a circuit extending from line 90 via the normal sides of contacts ABH$b$, BAH$b$ and ABT$b$ and the shifted side of contacts BAT$b$. If the hundreds and tens orders of results A and B were equal and the units order of result A were superior to the corresponding order of result B, the circuit of coil AGB would be completed via the normal sides of contacts ABH$b$, BAH$b$, ABT$b$, BAT$b$, and the shifted side of contacts ABU$b$. If the B result were superior in the units order, other orders being equal, the coil BGA would be energized via the normal sides of all the contacts preceding contacts BAU$b$ and via the shifted side of the latter contacts. If the results A and B were equal in all orders, then the circuit of coil AEB would be established via the normal, serially connected sides of contacts ABH$b$, BAH$b$, ABT$b$, BAT$b$, ABU$b$, and BAU$b$. It is clear, therefore, that coil AGB will be energized by a circuit completed via serially connected sides of relay contacts of the A and B order comparing relays only if result A is greater, in entirety, than result B. Likewise, coil BGA will be energized only if result B, as a whole, is greater than result A, while coil AEB will be energized only if the results A and B, in all orders, are equal. It should be noted, further, that the ultimate condition of the all-order comparing coils is not ascertained until the end of the "1" time of the result forming and comparing cycle. Thus, if result B were 46 and result A were 50, coil BAU would be energized at the "6" time and shift its contacts BAU$b$ to complete a circuit for coil BGA via the normal sides of contacts ABH$b$, BAH$b$, ABT$b$, BAT$b$, ABU$b$, and the shifted side of contacts BAU$b$. Coil BGA would be energized at the "6" time. One cycle point later; i. e., at the "5" time, coil ABT would be energized, its contacts ABT$b$ would shift, and the circuit of coil BGA would break while the circuit of coil AGB would make. The ultimate effect would be that coil BGA would be deenergized and coil AGB energized, consistent with result A, in entirety, being greater than result B.

In the manner indicated above, when the results are A: 98, B: 76, and C: 104; coil AGB is energized in section #1, coil CGB is energized through shifted contacts CBHB$b$ in section #2, and coil CGA is energized through shifted contacts CAH$b$ in section #3.

By the end of the "1" time of the result forming and comparing cycle; i. e., the fifth cycle concerned with the first card, comparing coils AGB, CGA, and CGB are energized, indicating result C to be largest and result B smallest. These coils remain energized as long as their control contacts remain in the positions they assume under control of the order comparing coils. As explained before, the order comparing coils when energized are held through their $a$ contacts and cam contacts C4 until the cam contacts open at "13" of the following cycle, which, for the first card, is the sixth cycle. During the sixth cycle, the first card will be directed to a pocket selected under control of the all-order comparing relays; in this case, to the pocket chosen for the card when result C is largest. Thus far, each of the results has been matched with each of the other two results. These matched pair comparisons control the setting of comparison elements cooperating according to the relative magnitude of all three results to control pocket selection.

Towards the end of the fifth cycle, cam contacts C1 (Fig. 9$a$) close again and feed clutch magnet PM is energized. Accordingly, the first card which has been at rest just in front of the sorting guide blades 55 (Fig. 1) will resume its feed at the beginning of the sixth cycle. Also, emitter EM1 brush 21 (Fig. 9$a$) wipes the emitter spots 1 to 12 during this cycle. Assume that socket (1), Fig. 9$a$, is plugged to socket 84–6, socket (2) to socket 84–7, and socket (3) to socket 84–9. With this plugging, the card will be directed to pocket 6 if result A is greatest, to pocket 7 if result B is greatest, and to pocket 9 if result C is greatest. Since switch handle 85 is set in "maximum" position, the left hand sides of switches 87 are closed. When brush 21 of emitter EM1 reaches spot 9, the following circuit is completed:

*C maximum sorting selection circuit.*—Line 91, the brush 21 and spot 9 of emitter EM1, a line 105, socket 84–9, the plug wire (not shown) to socket (3), thence via the left side of connected switch 87, contacts CGA$a$ (closed by energized coil CGA), contacts CGB$a$ (closed by energized coil CGB) and through sorting magnet SM to line 90.

It may be noted that this circuit can be closed only if result C is greater than result A and also greater than result B. Thus, the relative magnitudes of the three results are taken into account in this circuit, as well as in the other sorting selection circuits to be described.

Magnet SM is energized at the "9" time of the sixth cycle, at which time the leading edge of the first card is under the first blade 55 (Fig. 1). The other blades drop as the magnet SM pulls down its armature 60 while the first blade is sustained by the card. A path is thereby opened between the first and second blades to lead the card to the 9 pocket. The feed of the card to this pocket is effected by continuously rotating feed rolls 11.

It will be noted from the sorting selection circuit traced above that with the switch handle 85 (Fig. 9$a$) in maximum position, the circuit is completed through socket (3) if contacts closed by coils CGA and CGB are closed. These two coils are energized only if result C is greater than results A and B. Similarly, if result B were largest, coils BGC and BGA would be energized and contacts BGC$a$ and BGA$a$ would be closed and the sorting selection circuit would be routed through socket (2). If result B were largest, then coil CGB would not be energized and contacts CGB$a$ would not close, so that a selection circuit could not be routed through socket (3). If result A were largest, coils AGC and AGB would both be energized and their $a$ contacts closed to route a sorting selection circuit through socket (1). With result A largest, the coil CGA would not be energized, its $a$ contacts would be open and the sorting selection circuit through socket (3) would not be completed. Further, coil BGA would not be energized so that contacts BGA$a$ would be open to prevent routing of a sorting selection circuit through socket (2). In this manner, a sorting selection circuit may be routed through one of the sockets (1), (2), and (3) according to whether result A, B, or C is largest and provided switch blades 87 have a "maximum" setting.

If it is desired to sort a card to a chosen pocket when results A and B are equal and greater than result C, socket (4) is plugged to the socket 84 corresponding to the pocket and switch handle 85 is set in "maximum" position. When results A and B are equal and greater than result C, comparison coils AGC, BGC, and AEB are energized. The sorting selection circuit is then routed through socket (4), connected switch 87, and contacts AGC*b*, BGC*b*, and AEB*a* between this socket and sorting magnet SM. If the card is to be directed to a given pocket when results A and C are equal and higher than result B, socket (5) is plugged to the socket 84 corresponding to the pocket. With the results having the stated relationship, coils AGB, CGB, and CEA are energized. The sorting circuit then extends from socket (5) via a path including contacts CEA*a*, CGB*b*, and AGB*a*. If the card is to go to a desired pocket when results B and C are equal and higher than result A, socket (6) is plugged to a socket 84. With the results having the stated relation, coils BGA, CGA, and GEC are energized. The sorting circuit is then routed via socket (6) and a path including contacts CGA*b*, BEC*a*, and BGA*a*. To select a pocket for the card when results, A, B, and C are equal, socket (7) is plugged to a socket 84. The sorting selection circuit then extends from socket (7) via a path including contacts CEA*b*, BEC*b*, and AEB*a*.

If it is intended to sort to pockets according to a "minimum" determination, handle 85 is set in "minimum" position to close the right-hand sides of switches 87. Then, with result A the smallest, coils BGA and CGA will be energized and a sorting circuit will extend from socket (1) via the right side of connected switch 87 and the contacts CGA*c* and BGA*a*. With result B smallest, the circuit will be routed from socket (2) via a path including contacts CGB*c* and AGB*a*. If result C is smallest, the circuit will extend from socket (3) via contacts AGC*c* and BGC*c*. With results A and B equal but less than result C, the circuit through socket (4) will be routed via contacts CGA*d*, CGB*d*, and AEB*a*. The socket (5) circuit will be made if contacts CEA*c*, BGC*d*, and BGA*a* are all closed as is the case when results A and C are equal and less than result B. The socket (6) circuit path will be closed if contacts AGC*d*, BEC*c* and AGB*a* contacts all are closed, as is the case when results B and C are equal and less than result A.

Two or more of the sockets (1) to (7) may be plugged to the same socket 84 if it is desired to sort cards to the same pocket for two or more result relations. All seven sockets (1) to (7) may be plugged individually to different sockets 84 if the cards are to be sorted selectively to seven pockets according to the seven different result relations.

During the sixth cycle, as the first card is being sorted, the next card is feeding through the analyzer to control the setting of the value relays or groups A, B, and C (Fig. 9*a*). At "13" of the sixth cycle, the sorting selection for the first card has been completed and cam contacts C4 open, causing the individual order comparing and all-order comparing coils to be deenergized. The result forming and comparing means thereby are restored to normal before the beginning of the seventh cycle which is the result forming and comparing cycle for the second card.

The invention has many applications. A simple application will now be explained. Assume a large gasoline refining company has three depots at different geographical locations at which gasoline is stored and from which the material is shipped to retail points. The price of the gasoline at each depot may differ for several reasons such as varying costs of shipping to the depots from the refinery. Assume, further, that the shipping costs of the gasoline from the depots to the different retail points differ in accordance with the locations of the depots and the retail points. Now for each shipment to be made, a card is punched in three fields with three shipping costs each being the cost of shipping from one of the three depots to a particular retail point. A stack of such cards is placed in the machine. Handle 65 may be set at minimum (Min.) position. For each card, the machine will form results A, B, and C and compare them. Result A may be the total of the cost of the gasoline at depot #1, preset in unit A (Fig. 3), plus the cost of shipping, derived from field A of the card, from depot #1 to the retail point. Result B may be the total derived from unit B and card field B and relate to depot #2. Result C may be the total derived from unit C and card field C and relate to depot #3. Now, if the total A is found to be smallest, the card will be sorted to a first pocket, if the total B is smallest, the card is sorted to a second pocket, if total C is smallest the card is sorted to a third pocket, if totals A and B are equal but less than total C, then a fourth pocket will receive the card. If totals A and C are equal and less than total B, a fifth pocket will receive the card. If totals B and C are equal and less than total A, a sixth pocket will receive the card. If totals A, B, and C are equal, a seventh pocket will receive the card. The cards in the stack will thus be sorted to different pockets in accordance with the relations between totals A, B, and C, each total pertaining to one of the depots #1, #2, and #3. Cards in the first pocket will denote shipments to be made from depot #1, cards in the second pocket will denote shipments to be made from depot #2, and so on.

MODIFICATION OF MANUAL AMOUNT SELECTOR

Figs. 10 and 11 show a modification of manual amount selectors. Each order comprises an indicating wheel 130 have two successive sets of value bearing projections 131. Each set has ten projections bearing values 0 to 9. The wheel is manually settable to place a desired value indication in index position at a sight opening in the common housing. Carried by the wheel is a brush holder 132 of insulating material which carries four pairs of brushes 133, each pair having opposite brushes. One pair of brushes appears in Fig. 11 and all four pairs appear diagrammatically in the circuit diagram (Fig. 9*bb*). Each brush pair coacts with a fixed readout commutator, one semicircle of which contains ten conductive segments 134 (Fig. 11) corresponding to values 0 to 9, while the opposite half has a collector segment 135. When the indicating wheel is set in any value position, one of the brushes of each pair will engage the corresponding value segment of the associated commutator while the opposite brush will engage the collector segment of the commutator.

It is to be understood that there will be one selector group for each amount field. Three such groups and three related fields are dealt with here, as illustrative. As in the main selector form, the modified selector groups are conveniently marked A, B, and C in Fig. 10 and will be differentiated in this manner. Each selector group will be considered as having a tens and a units order and the card field also as having correspondingly ordered columns. Fig. 9*bb* shows the circuit connections for group A of the modified selectors. This figure may be considered a substitute for Fig. 9*b* and is to be taken together with Figs. 9*a* and 9*c*. The elements which are similar in Fig. 9bb to those in Fig. 9b will be designated the same as in the latter figure.

Reference to Fig. 9bb shows that a set of four code coils A1U, A2U, A3U, and A4U are provided for the units order of group A. A similar set of code coils is provided for the tens order of group A and for each order of the other groups. Each of the four commutators of an order is in circuit with one of the code coils. The upper commutator, as viewed in Fig. 9bb thus has its collector segment 135 connected to the code coil of which the designation includes number 1. The other three are connected individually to the coils with numbers 2, 3, and 4 in their designations. The value setting of the selector order will be translated through the commutators into operations of the relay coils singly and in combination to manifest the manually selected value. It is to be noted that value segments 1, 5, and 8 of the upper commutator are connected into circuit while the other segments are not connected. Thus, if either the 1, 5, or 8 segment of the upper commutator is engaged with a brush 133; as will be the case if the order is set to value 1, 5, or 8, then the coil with digit 1 in its designation will be energized. For example, if the units order of group A is set to value 1, the circuit of coil A1U will be completed from line 90 via this coil, the collector segment 135 of the upper commutator, the brushes 133 and the 1 segment 134 to line 91. The commutator below the uppermost one has its 2, 6, and 9 segments connected into circuit, so that if the selector order is in either value position 2, 6, or 9, the circuit of coil A2U will be made. The next lower commutator has its 3, 7, 8 and 9 segments connected into the circuit, so that if the order is in either of value positions 3, 7, 8 and 9, coil A3U will be energized. The lowest commutator has its 4 to 9 segments connected into circuit so that with the order set in any one of the value positions 4 to 9, coil A4U will be energized. It will be understood now that the set of code coils of a selector order are energized singly or in various combinations to manifest electrically the value for which the order is adjusted. Coils A1U, A2U, A3U, and A4U will be energized singly to manifest values 1, 2, 3, and 4 respectively. Coil A4U will be energized together with either coil A1U, A2U, or A3U to manifest either value 5, 6, or 7. Coils A4U, A3U, and A1U are energized together to manifest value 8, and coils A4U, A3U, and A2U are energized concomitantly to manifest value 9. The coil or coils energized for each value may be understood at a glance in Fig. 9bb by noting which of the four corresponding value segments in vertical alignment are connected into circuit while bearing in mind that the four commutators are associated with the "1," "2," "3," and "4" code coils.

Energization of a code coil shifts its related column of transfer contacts "a" to "j" to positions reverse to those shown in Fig. 9bb.

The preliminary operations and the machine cycles are the same for this embodiment as for the main embodiment. Thus, the timing chart, Fig. 8 applies to both of these embodiments. During the fourth cycle, the first card will be analyzed and the amount designations in its three amount fields converted into operations of the value relay coils of groups A, B, and C shown in Fig. 9a. The card will stop at the end of the 4th cycle and during the 5th cycle, the amounts derived from card fields A, B, and C will be combined with the amounts in selectors A, B, and C cycle, the results will be compared and the selection of a card pocket for the card effected according to the comparison determination.

The combination of card amount A with settable amount A will now be described with particular reference to Fig. 9bb. As an example, assume card amount A to be 29 and selector A amount to be 84. The card amount is manifested by energized value relay coils 2AT and 9AU (Fig. 9a). The selector amount is manifested in the units order by energized code coil A4U (Fig. 9bb) and in the tens order by energized code coils A4T, A3T, and A1T. Since the sum of the units order values is 13, carry is to be effected to the tens order of the result forming means. When value relay coil 9AU was energized and held as the result of analysis of the card during the fourth cycle, it closed related contacts 9AUd (Fig. 9bb, lower right). Since coil A4U also has been energized, relay contacts A4Uk are in shifted condition. Accordingly, upon closure of contacts 9AUd, a circuit is established from line 90 through carry coil AZU, the shifted side of contacts A4Uk, the normal sides of contacts A3Uk, A2Uk, and A1Uk and via now-closed contacts 9AUd to line 91.

It may be noted that carry relay circuits for carry control are so arranged that with the contacts A4Uk closed, the circuit of coil AZU will be made through either of the closed contacts 6AUd to 9AUd. Likewise, for any other settable value, the coil AZU will be energized whenever the sum of the unit order values in the card field and the selector exceeds 9.

A general similar relay network is provided for the carry coil AZT of the tens order. In the present example, the settable tens order value is 8 and coils A4T, A3T, and A1T have been energized. During the fourth cycle, owing to analysis of value 2 in the tens order, card value relay coil 2AT (Fig. 9a) was energized and held. If coil AZU had not been energized, the closure of contacts 2ATd would complete a circuit from line 90 through the carry coil AZT, the now-closed contacts A4Tm, the now-close contacts A3Tn, the shifted side of contacts A1Tn, the normally closed side of one of the column of contacts "d" of coil AZU, and through now-closed contacts 2ATd, to line 91.

It may be noted that when the sum of the tens order digits of the related selector and card amounts is 9 and the units order sum of such amounts exceeds 9, that carry coil AZT will be energized by a circuit extending via the shifted side of one of the column of contacts AZUd of the energized coil AZU. For instance, assume the settable tens order value is 8, as before, but the card value in this order is 1 instead of 2, so that coil 1AT is energized. The circuit for coil AZT then proceeds from the shifted side of contacts A1Tn via the shifted side of one of contacts AZUd and through the closed contacts 1ATd to line 91. In the previously chosen example of card amount 29 and selector amount 84, units order carry coil AZU was energized in the manner described. Hence, the first circuit, traced before, through tens order carry coil AZT will not make. Instead, the following circuit makes: From line 90 through AZT, A4Tm (now closed), the now shifted side of A3Tm, the shifted side of one of the AZUd contacts, and thence via now closed 2ATd contacts to line 91. Coils A4T and A3T, which operated contacts A4Tm and A3Tm, not only represent value 7 but are in the combination of code coils representing value 8.

It may be understood from the above description and from Fig. 9bb that the circuit network of coil AZT is so devised as to provide for energization of this coil whenever the preselected value and card value in the tens orders add up to 10 or more and, also, whenever these values add up only to 9 but only then upon condition that units order carry coil AZU has been energized.

When carries are indicated, the carry coils are energized during the fourth or analyzing cycle and remain energized until the card value relay coils are deenergized upon opening of cam contacts C5 (Fig. 9a) in the fifth or result forming and comparing cycle. During this latter cycle, as emitter EM2 (Fig. 9bb) is successively in positions 9 to 1, the result coils ARU, T, and H are energized at differential times under control of the code relays and the card value relays and under further control of the carry relays. Energization of carry coil AZU shifts the column of c contacts to cause a tens order result involving carry of unity to be read out. Coil AZT closes contacts AZTa to connect result coil ARH to the 1 spot of emitter EM2. In the example where the units order settable value is 4 and the card value in this order is 9, code coil A4U and card value relay coil 9AU are energized. At the "3" time of the fifth cycle; i. e., at the time corresponding to the right-hand digit 3 of the sum of values 4 and 9, the circuit of result coil ARU is established as follows: From line 90 through the brush and 3 spot of EM2, the wires 110 and 111, the normal sides of contacts A1Uc, A2Uc and A3Uc, and thence through the shifted side of contacts A4Ui, through the closed contacts 9AUb, and through coil ARU, to line 91. At the "1" time; i. e., the time corresponding to the right-hand digit of the sum of the tens order selector value 8 and the tens order card value 2 plus the carry value of 1 from the units order, the circuit of coil ART is completed as follows: From line 90, through the "1" position of EM2, the wires 112 and 113, contacts A1Tj, the normal side of contacts A2Tj, via the shifted sides of contacts A3Tg and A4Tc, the shifted side of one of the column of c contacts of energized coil AZU, through the closed 2ATb contacts and the result coil ART to line 91. Concurrently, as the emitter EM2 is in "1" position, coil ARH is energized via contacts AZTa.

In a similar manner, the result coils of the other groups B and C will be energized at differential times during the fifth cycle. The result comparing operations and the pocket selection operations are the same for this embodiment as for the preceding embodiment and need not be described again.

The result magnets and relays may be termed value representing means since their differential operation reflects the values or amounts determined by the settable selectors and the records. The result magnets will represent the values derived from the records alone if the settable selectors are set at zero. This may be desired when the records are to be sorted according to the relative magnitude of the more than two values designated on the records. The result magnets may represent the settable values alone when the record has zero designations or is blank in the amount fields.

SECOND EMBODIMENT—USING POSITIONAL VALUE EQUIVALENTS

In the main embodiment described before, the card values were read out as differentially timed equivalents to operate the card value storage relays. Further, the results were formed as differentially timed equivalents and compared in the first instance according to their differential time relations. The comparison determinations were read out at differential times to control sorting of the card which was then moving within the sorting guide blade station. In the second embodiment to be described below, the card values will be read out while the card is at rest according to their differential designation positions. The results will be formed as positional equivalents, not dependent on differential timing, and the comparison will be made with respect to the positional value significance of the results. Instead of controlling card sorting by the comparison determination, the comparison determinations will be manifested otherwise, as by operation of signals.

The second embodiment preferably uses manual preselectors such as shown in Figs. 10 and 11 and in the circuit diagram, Fig. 9bb, and described as the modified manual amount selectors. Preferably, this embodiment utilizes a pin box analyzer for the cards of the general type shown, for instance, in Hollerith U. S. Patent Nos. 395,781 and 685,608. The cards may be fed into and removed from the pin box in any suitable manner known to the art or may be inserted and removed manually one card at a time. One column of this analyzer is shown in circuit form in Fig. 13a. It is to be understood, however, that there is one analyzer column for each column of the amount fields. For convenience, the card will be considered as having three amount fields, each with two ordered columns. Each analyzer column has ten pins or brushes 150, each for engaging, through a perforation in an index position of the card column, with a common collector plate 151. Each pin 150 is in circuit with a value relay coil, and the pins and connected coils may be differentiated according to the values 0 to 9 to which they relate. Since three amount fields are to be dealt with, three groups of relay coils will be considered. These groups and related fields may be differentiated by letters L, M, and N. The designation of a coil includes, as the first character, the value to which it corresponds, as the second character, the letter of the group to which it belongs, and, as the third character, the letter indicative of the order in which it is contained; e. g., coil 9LU is the 9 value coil in the units order of group L.

The amount preselectors are of the kind previously described and shown in Figs. 10 and 11. In this instance, the groups of selectors may be referred to by letters L, M, and N to correspond to the designations of the related card fields and value relay coils. The tens and units orders of selectors L are shown in detailed circuit form in Fig. 13b, while the other selectors are indicated diagrammatically in Fig. 13c. The value setting of each selector order is translated into energization singly or in various combinations of four code coils, just as previously described. In this instance, the code coils are designated by the group letters L, M, and N followed by the values to which they relate and the orders in which they belong; e. g., code coil L2T is the coil in the tens order of group L of the selectors and its energization manifests value 2. Energization of the 1, 2, 3, and 4 value code coils manifests their indicated value while their energization in combinations manifests the sum of the individual values; e. g., coils L2T, L3T, and L4T in combination manifest value 9 in selector L, tens order. As soon as power is placed on opposite circuit lines 152 and 153, the code coils became energized singly or in combination to manifest the values for which the related selector groups have been adjusted.

A keyboard (Fig. 12) is provided with four operation initiating keys K1, 2, 3, and 4 with a release key K5. The four operation keys overlie contact blades 160 of key contacts designated by the key symbols followed by letter $a$; e. g., K1$a$. Upon depression of a key, it lowers its related blade 160 to close the key contacts. When a blade 160 is lowered, it is latched down by a spring-pressed lever 161. These levers are in front of a bail 162 one arm of which has a cam block 163 underlying the inclined tip of release key K5. Depression of this key cams the bail rearwardly to engage and release latch levers 161 from blades 160, whereby the key contacts are restored to open condition. The operation keys K1, 2, 3, and 4 are actuated in the order named to initiate operations of the machine in proper sequence. These operations will now be described with reference to Figs. 13$a$, $b$, $c$, and $d$.

After a card has been positioned in the pin box analyzer, the operator depresses key K1 closing key contacts K1$a$. Referring to Fig. 13$a$, closure of these contacts connects the common plate 151 of the analyzer to circuit line 152 and enables analyzing circuits to be completed for energizing the card value relay coils according to the value designations in the three card fields L, M, and N. For instance, if field L has a 3 designation in the tens order column, coil 3LT is energized by a circuit extending from line 152 via contacts K1$a$, the common plate 151, the brush 150, sensing the perforation, and through coil 3LT to opposite line 153.

In a similar manner, all the other values designated in the amount fields are converted into operations of the card value relay coils related thereto.

At the bottom of Fig. 13$b$ are shown the carry control networks for determining energization of carry coils LZT and LZU in accordance with the contacts closed by the active code coils and card value relay coils. The circuits for energizing coils LZT and LZU are similar to those described before with reference to coils AZT and AZU of Fig. 9$bb$. These circuits, therefore, will not be described further.

After analysis of the card and the operation of the card value relay coils have been completed, the operator depresses key K2, closing contacts K2$a$. Referring to Fig. 13$b$, closure of these key contacts connects the circuit line 152 to the common side of ten result coils in each order. Each result coil of an order manifests a different result value when energized. The coils are designated by the denomination identifying letter U or T followed by the group letter in turn followed by the value symbol. Thus, the result coils of the units order of group L are designated UL1 to UL9. One of these result coils in each order will be energized under control of the code and card value relay contacts to manifest the sum of the card and settable values in the order or the right-hand digit of such sum if the sum exceeds 9. Assume, for instance, that the units orders of the field L and the selector L respectively, contain values 2 and 7. The card value 2 is now manifested by active value coil 2LU. The present value 7 is manifested by active code coils L4U and L3U. Upon closure of key contacts K2$a$, the following circuit is established in the units order of section L of the result forming means (Fig. 13$b$): From line 153, through the value relay contacts 2LU$a$ (now closed), the shifted side of code relay contacts L4U$b$, the shifted side of contacts L3U$f$, and via the normal sides of contacts L2U$i$ and L1U$i$ through result coil UL9, and via key contacts K2$a$ to line 152.

In a similar manner, one of the result coils of the tens order of section L is energized to manifest the sum or the right-hand digit of the sum of tens order values in card field L and selector L with the sole difference that the circuit of a tens order result coil includes either the normal or shifted side of one of the column of contacts LZU$a$. A hundreds order result is obtained only by a carry of unity from the tens order and in this embodiment is manifested directly by energization of coil LZT.

The other results M and N are similarly formed and manifested by selectively energized coils UM1 to 9, TM1 to 9, MZT for section M and by selectively energized coils UN1 to 9, TN1 to 9, and NZT for section N.

The machine is now ready to compare each result with each of the other results, digit by digit, in the corresponding orders. As shown in Fig. 13$d$, six columns of digit comparing coils are provided. The left-hand column compares the digits of the tens order result L with the digits of the tens order result M; the second column from the left compares the tens order digits of results M and N; the third column compares the tens order digits of results L and N; the fourth column compares the units order digits of results L and M; the next column compares the units order digits of results M and N, and the right-hand column compares the units order digits of results N and L. Thus, the digits of each result order are compared with the digits of the corresponding order of each of the other results. There are ten pairs of digit comparing coils in each column. Energization of one coil of the pair signifies a superior digit in one result order, while energization of the other coil of the pair signifies a superior digit in the compared order. The designations of the digit comparing coils symbolize the comparison determination manifested by their energization. The first letter of the designation of a digit comparing coil is the symbol of the group containing the superior digit, the next letter is the symbol of the group containing the inferior digit, the third letter is the order identifying letter, and the appended number indicates the digits compared by the coil. For example, coil LMU9, if energized, signifies that result L contains 9 in the units order while result M does not have a 9 in the units order. As will be brought out subsequently, the highest compared digits in an order determine the relative magnitude for this order.

Each digit comparing coil is connected at one side to the normally open side of a transfer switch operated by the result coil of the group whose letter is the first letter of the comparing coil designation. The digit comparing coil is connected at the opposite side to the normally closed side of the transfer switch of a result coil of the group whose letter is the second one in the comparing coil designation. For example, coil LMU9 is connected at one side to the normally open side of transfer switch UL9$a$ and at the opposite side to the normally closed side of transfer switch UM9$a$. If the result coil UL9 (Fig. 13$b$) is energized, it will shift switch UL9$a$ to close its normally open side. If, at the same time, coil UM9 is energized, the normally closed side of transfer switch UM9a opens to prevent energization of coil LMU9. However, if coil UM9 is not energized, its transfer switch stays in normal condition and coil LMU9 will be energized upon initiation of comparing operations. Each pair of lower value digit comparing coils of a column is connected to circuit through a path including relay contacts $a$ of all the higher digit comparing coils. This path is opened by energization of any one of the higher digit comparing coils. For instance, coil LMU3 is connected to circuit through contacts LMU9a and MLU9a and will not be energized if either coil LMU9 or MUL9a is energized. Thus, the energized comparing coil relating to the higher of compared digits always dominates.

The highest order of a result; in this case, the hundreds order, may contain digit 1 or zero. The hundreds order digit section for comparing the digits of a pair of results in this order therefore requires only two digit comparing coils to compare digits 1. Fig. 13d shows three digit comparing sections to compare the highest order of each result with each other result. The upper section in Fig. 13d compares results L and M, the second compares results M and N, and the third section compares results L and N. If result L has a digit 1 in the highest order while result M lacks this digit in the corresponding order, coil LMHI is energized through shifted contacts LZTa. On the other hand, if result M has a digit 1 and result L lacks the digit 1 in the hundreds orders, coil MLHI is energized through contacts MZTa. If both the M and L results are lacking in digit 1 in the highest orders or both have digits 1, neither coil LMHI nor MLHI will be energized. Likewise, either one or neither of coils MNHI and NMHI will be energized depending on the condition of contacts MZTb and NZTb, in turn dependent on whether results M and N contain digits 1 in the highest orders. Similarly, either one or neither of coils LNHI and NLHI will be energized depending on the condition of contacts LZTb and NZTb.

To initiate the digit comparisons in all orders of the results, the operator depresses key K3 closing key contacts K3a (Fig. 13d). Closure of these contacts connects the common line 165 of the digit comparing coils to circuit line 152. The digit comparing coils are thereupon energized according to the digits in the compared result orders as manifested by the condition of the transfer contacts $a$ of the result coils. To take a specific example, assume result L to be 98, result M to be 107, and result N to be 68. These results are manifested by energized coils TL9 and UL8; MZT and UM7; and TN6 and UN8.

In the L & M (units) digit comparing section, contacts UL8a and UM7a are shifted by their energized result coils UL8 and UM7. The closure of the normally open side of contacts UM7a partially closes the circuit path through digit comparing coil MLU7 since contacts UL7a remain normal. However, the circuit of coil MLU7 will not be completed if any one of contacts MLU9a or MLU8a or LMU9a or LMU8a is open. In this instance, coil LMU8 is energized by a circuit extending from line 153 through contacts LMU9a, the shifted side of contacts UL8a, thence through comparing coil LMU8, the normal side of contacts UM8a, the contacts MLU9a and via line 165 and key contacts K3a to line 152. Energized coil LMU8 opens contacts LMU8a, thus opening the circuit path of coil MLU7.

In the M & N (units) comparing column, digit comparing coil NMU8 is energized by a circuit such as the one just traced and routed through the shifted side of contacts UN8a and the normal side of contacts UM8b. Energization of coil NMU8 indicates that in the units orders, result N has an 8 digit and result M has a lower digit. In the L & N (units) column, none of the coils is energized since the units orders of result L and M have equal digits 8, so that the condition of both contacts UL8b and UN8b is reversed. In the L & N (tens) column, coil LNT9 is energized by a circuit routed through contacts TL9a and TN9a. In the M & N (tens) column, coil NMT6 is energized by a circuit routed through contacts TN6b and TM6a. In the L & M (tens) column, coil LMT9 is energized by a circuit extending through contacts TL9b and TM9b. In the L & N (hundreds) digit comparing section, neither of coils NLHI and LNHI is energized because contacts LZTb and NZTb remain normal. In the M & N (hundreds) section, coil MNHI is energized through the shifted side of contacts MZTb and the normal side of contacts NZTa. In the L & M (hundreds) section, coil MLHI is energized through the normal side of contacts LZTa and the shifted side of contacts MZTa.

The digit by digit comparisons in the different orders of the results are now manifested by energized coils LMT9, NMT6, LNT9, LMU8, NMU8, MLHI, and MNHI. The digit by digit comparison in the tens and units orders may be manifested by energization of any of a set of nine digit comparing coils in each order if one result has a greater value digit in the order than the opposing result and by energization of any of another set of nine digit comparing coils if the opposing result has a larger digital value. To simplify the ultimate comparison determinations, the digit by digit comparisons will first be reduced to an order by order comparison for energizing one or another of order comparing coils in each of the orders. This operation and the ultimate comparison determinations and manifestations are initiated by depressing key K4, closing key contacts K4a (Fig. 13a). The closure of contacts K4a connects common wire 170 of the order comparing sections (Figs. 13a and 13c) and final comparison manifesting means (Fig. 13c) to the circuit line 152. Each order comparing section has two order comparing coils. One coil will be energized if the result is greater in the related order and the other coil will be energized if the compared result is greater. Neither coil will be energized if the results are equal in the related order. In each digit comparing section, only one or none of the digit comparing coils has been energized. In each of the digit comparing sections of the hundreds orders (Fig. 13d), there are two digit comparing coils. Accordingly, each hundreds order comparing section (Fig. 13a) has only two contacts, one closed by one digit comparing coil to cause energization of one order comparing coil and the other closed by the other digit comparing coil to cause energization of the other order comparing coil. According to the assumed example, in the L & M (H) hundreds order comparing section (Fig. 13a), the $a$ contacts of energized coil MLHI are closed and order comparing coil MLH is energized by a circuit extending from line 152 via key contacts K4a, wire 170, contacts $a$ of MLHI coil, and through coil MLH to line 153. Order comparing coil LMH remains unenergized because the $a$ contacts of coil LMHI have not closed. In the next hundreds order comparing section, the $a$ contacts of coil MNHI are closed and the circuit of order comparing coil MNH is completed, while coil NMH remains unenergized. In the remaining hundreds order comparing section, neither coil LNH nor NLH is energized since the *a* contacts of neither digit comparing coil LNH1 nor NLH1 have been closed.

Each of the tens and units order comparing sections (Fig. 13c) has nine parallel digit comparing relay contacts *b* controlling energization of one order comparing coil and nine parallel digit comparing relay contacts *b* controlling energization of the other order comparing coil. Each of the digit comparing relay contacts *b* is operated by a related digit comparing coil, only one of which may be energized in each section as a result of the digit comparing operations. The closure of the *b* contacts of any one of the digit comparing coils of a section causes energization of the related order comparing coil. If none of the digit comparing coils of a section is energized, neither of its pair of order comparing coils will be energized. In the assumed example, digit comparing coils LMT9, NMT6, LNT3, LMU8, and NMU3 have all been energized. Accordingly, in the L & M (T) order comparing section (Fig. 13c), the *b* contacts of energized coil LMT9 are closed and complete a circuit from line 170 via contacts *b* of coil LMT9 and through order comparing coil LMT to line 153. In the next section to the right, coil NMT is energized through contacts *b* of energized coil NMT6. In the next section, coil LNT is energized via the closed *b* contacts of energized coil LNT9. In the L & M (U) section, coil LMU is energized via contacts *b* of energized coil LMU3. In the next section to the right, coil NMU is energized via contacts *b* of energized coil NMU3. In the right-hand section, neither coil LNU nor NLU is energized since none of the *b* contacts of the N and L digit comparing coils of the units order has been energized.

At this time, the following order comparing coils are energized:

MLH, MNH (Fig. 13a)
LMT, NMT, LNT (Fig. 13c)
LMU, NMU

Figure 13C:
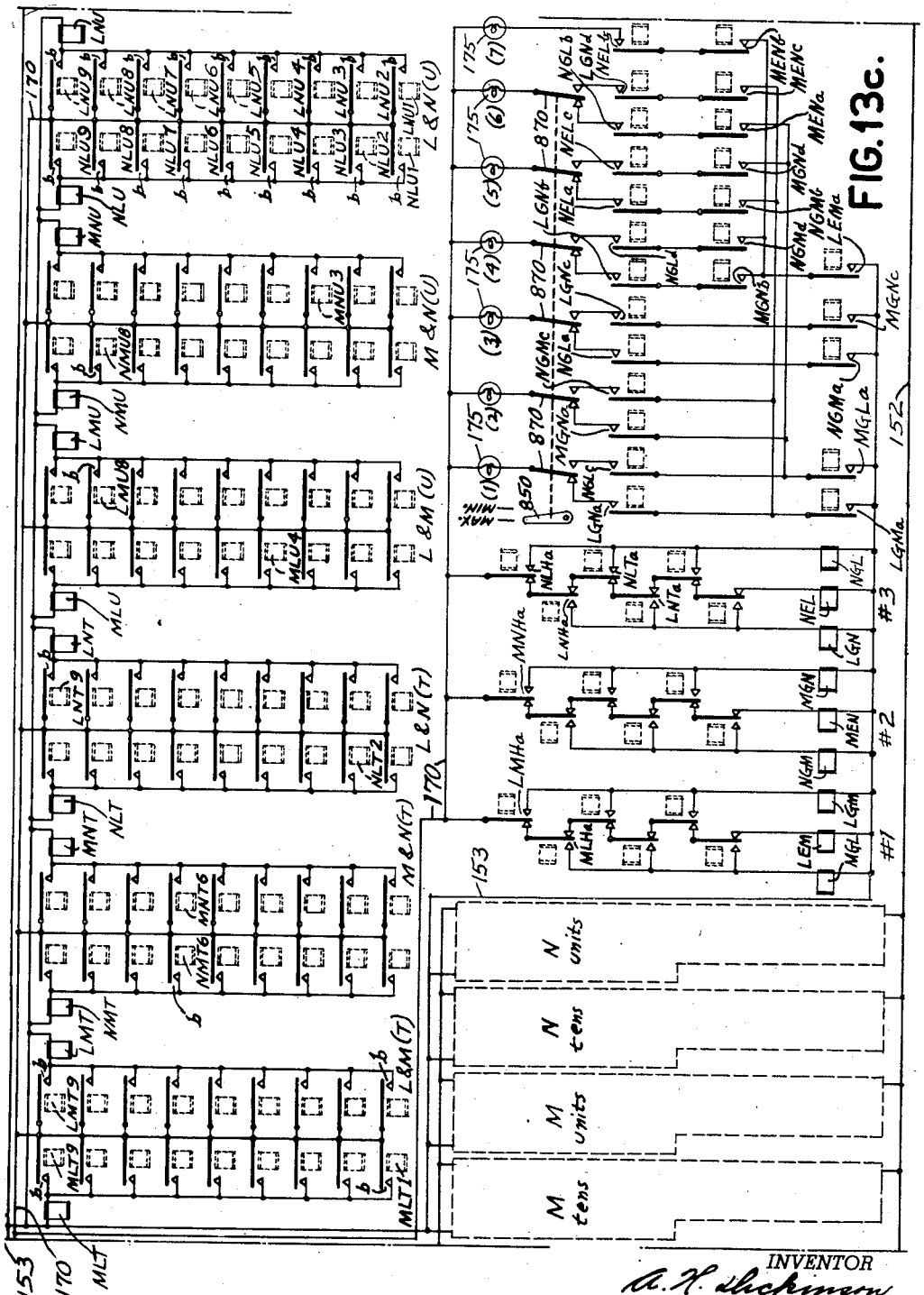

The function of the order comparing coils of the embodiment being described is the same as that of the order comparing coils of the main embodiment and which are designated ABH, T, U; ACH, T, U, BAH, T, U, etc. (see Fig. 9c). The order comparisons, as in the first embodiment, will be reduced to an all-order result comparison between each result and each of the other two results. The all-order comparing sections in Fig. 13c are marked #1, #2, and #3 to correspond to the designation of the similar sections in Fig. 9c. The comparing coils MGL, LEM, and LGM of section #1 in Fig. 13c correspond, respectively, to coils BGA, AEB, and AGB of section #1 in Fig. 9c. Likewise, the comparing coils of the other sections in Fig. 13c correspond to the coils in the similarly numbered sections in Fig. 9c. The relay network for the coils of sections #1, #2, and #3 in Fig. 13c is similar to that of the corresponding coils in Fig. 9c. In the embodiment being described, the sections #1, #2, and #3 is connected to circuit line 152 through line 170 and key contacts K4a (Fig. 13a). In the example under discussion, coil MGL is energized in section #1 by a circuit routed from line 170 through the normal side of contacts LMHa, and via the shifted side of contacts MLHa through coil MGL to line 153. In section #2, MGN is energized by a circuit completed through the shifted side of contacts MNHa.

In section #3, coil LGN is energized by a circuit extending through the normal sides of contacts NLHa, LNHa, and NLTa, thence via the shifted contacts LNTa, through coil LGN.

The comparison determinations of each result versus each of the other two results are correlated to provide a comparison determination with respect to all three results, as was done in the main embodiment in the course of selecting a pocket for the card. In the present embodiment, the final result comparisons are manifested by selectively lighting signal lamps 175 (Fig. 13c). There are seven lamps 175, each further differentiated by one of the designations (1) to (7) and corresponding in significance to sockets (1) to (7) of Fig. 9a. Switch handle 850 and switches 870 correspond to handle 85 and switches 87 of Fig. 9a. When the switch handle is in "maximum" position, lamp 175 (1) signifies that result L is the largest of the three results, lamp 175 (2) signifies result M to be largest, lamp 175 (3) indicates result N to be largest, lamp 175 (4) indicates that results L and M are equal and larger than result N, and so on. When switch handle 850 is in "minimum" position, minimum comparison determinations will be effected, as in the main embodiment. The relay network in the lamp circuits is the same as that in the sorting pocket selection circuits of the main embodiment (Fig. 9a). In the present embodiment, however, the circuits are closed selectively without respect to differential timing and the final comparison determination is indicated by the particular lamp 175 (Fig. 13c) which is lighted. In the example under discussion, coils MGL and MGN and coil LGN have been energized. With handle 850 in "maximum" position, the lamp 175 (2) is lighted by a circuit extending from line 170 through lamp 175 (2), the left side of related switch 870 and via the now-closed contacts MGNa and MGLa, to line 153. Since the switch handle 850 is in "maximum" position, the lighted lamp 175 (2) signifies that result M is larger than either result L or result N. Closure of contacts LGNa is insufficient to light lamp 175 (1) since contacts LGMa are open. If handle 850 were in "Min." position, lamp 175 (3) would be lighted to indicate that result N was smallest of the three results. The circuit for lamp 175 (3) extends from line 170 through this lamp, the right side of connected switch 870, now-closed contacts LGNc, now-closed contacts MGNc, and to line 153.

To prepare the machine for operation under control of the next record card, the operator depresses the key K5 (Fig. 12). Consequently, all the key contacts open, disconnecting the various relay coils from circuit. The elements of the machine are thereby restored to initial condition.

It should be noted that the columns of result magnets are, in effect, amount or value representing means, regardless of the source of the amounts. The selectively energized result magnets represent the amounts or values to be compared for determining machine operation. The energization of the result magnets may represent the card amounts themselves if the preselectors are set at zero value positions. The card amounts, in the first instance, are transferred from the card to the card value relays from which they are transmitted to the result magnets through the selector networks.

While there has been shown and described and pointed out the fundamental novel features of the invention as applied to a plurality of embodiments, it will be understood that various omissions and substitutions and changes in the form and details of the devices illustrated and in its operation may be made by those skilled in the art without departing from the spirit of the invention. It is the intention therefore to be limited only as indicated by the scope of the following claims.

What is claimed is:

1. A machine comprising a plurality of electrical result value forming sections, each having a circuit network of result forming and manifesting circuits including contacts settable to represent a constituent value and other contacts settable to represent another constituent value and cooperating with the first-named contacts in selecting a circuit for closure according to a result value combining the constituent values, differentially timed circuit closing means to close the selected circuits at differential times for forming and manifesting result values combining the constituent valves represented in the plurality of sections, and comparing means for comparing the result values for relative magnitude and including relays operated under control of the circuits at their differential times of closure and effecting comparing operations determined by the differential closure times.

2. A machine comprising three value representing sections to represent three values, means for comparing the values and including elements controlled by each representing section to compare the relative magnitude of each represented value and each of the other represented values to effect matched value pair comparison determinations of their relative magnitudes, devices for manifesting the matched pair comparisons, means controlled by said devices for reducing the matched pair comparison determinations to a final comparison determination of the relative magnitude of all the represented values, each with respect to the plurality of others, and means controlled thereby for manifesting the final comparison result.

3. A record handling machine comprising means to sense a record for value designations, three value manifesting means, means under control of the sensing means according to sensed value designations for controlling each manifesting means to manifest a value, means controlled by the manifesting means to ascertain the magnitude of each of the three values with respect to each of the other two values and including elements selectively conditioned according to the value pair comparison determinations, and means controlled by said elements according to their selective conditioning for ascertaining from the value pair comparison determinations the magnitude relationship of all three values.

4. A machine comprising a plurality of amount integrating units, each including a plurality of constituent amount representing elements and each unit constructed to transiently integrate, by cooperation of the constituent amount representing elements therein, a plurality of represented constituent amounts into a total, devices controlled therethrough for manifesting the totals as they are formed, differentially timed means included in the integrating units to cause them to transiently integrate the constituent amounts so as to form the totals at differential times corresponding to the digits of the totals and therethrough to operate the said devices for transiently manifesting these digits at said differential times, and comparing means controlled by said devices according to their differentially timed manifesting operations for ascertaining the relative magnitude of the totals.

5. In combination, three value representing sections to represent three plural order amounts, circuits controlled by each representing section to compare the relative magnitude of each order digit of each represented amount and the corresponding order digit of each of the other represented amounts to effect order-by-order comparisons of the relative magnitude of three different matched amount pairs, relays selectively operated by said circuits according to said order-by-order comparisons, three all-order comparing circuits, each selectively closed under control of the relays relating to each order-by-order comparison of a different matched amount pair to determine the relative magnitude of the paired amounts in entirety, contacts selectively closed by the all-order comparing circuits according to the all-order comparison determinations, and circuits selectively closed through said contacts to reduce the all-order matched amount comparison determinations to a final determination of the relative magnitude of all three amounts.

6. A machine comprising a plurality of total forming sections, each having a circuit network of a plurality of different total forming and manifesting circuits including contacts settable selectively to represent one constituent value and other contacts settable selectively to represent another constituent value and cooperating with the first named contacts in selecting a circuit for closure to form and manifest the total of the constituent values, differentially timed circuit closing means to close the selected circuits at differential times for forming and manifesting the totals of the constituent amounts represented by the cooperating contacts in the plurality of sections at such differential times, and comparing means for comparing the totals for relative magnitude and including relays operated under control of the circuits at their differential times of closure and effecting comparing operations determined by the differential times of closure and thereby determined by the totals formed and manifested by the selected circuits of the plurality of sections.

ARTHUR H. DICKINSON.

REFERENCES CITED

The following references are of record in the file of this patent:

UNITED STATES PATENTS

| Number | Name | Date |
|---|---|---|
| 1,914,272 | McFall | June 13, 1933 |
| 2,172,328 | Bryce | Sept. 5, 1939 |
| 2,189,024 | Bryce | Feb. 6, 1940 |
| 2,250,847 | Torkelson | July 29, 1941 |
| 2,019,863 | Kolm | Nov. 5, 1935 |
| 2,074,392 | Herbst | Mar. 23, 1937 |
| 2,178,064 | Bryce | Oct. 31, 1939 |
| 2,228,330 | Torkelson | Jan. 14, 1941 |
| 2,230,129 | Bryce | Jan. 28, 1941 |
| 2,243,474 | Bryce | May 27, 1941 |
| 1,927,702 | Foss | Sept. 19, 1933 |
| 2,066,783 | Kolm | Jan. 5, 1937 |
| 2,116,653 | Armbruster | May 10, 1938 |

FOREIGN PATENTS

| Number | Country | Date |
|---|---|---|
| 523,710 | Great Britain | July 19, 1940 |